US010156764B2

(12) United States Patent
Garcia et al.

(10) Patent No.: US 10,156,764 B2
(45) Date of Patent: *Dec. 18, 2018

(54) ELECTROCHROMIC SYSTEM AND METHOD FOR CONTROLLING PHOTOCHROMIC DARKENING

(71) Applicant: HELIOTROPE TECHNOLOGIES, INC., Alameda, CA (US)

(72) Inventors: Guillermo Garcia, Oakland, CA (US); Sourav Basu, Oakland, CA (US); Jason Holt, Larkspur, CA (US)

(73) Assignee: HELIOTROPE TECHNOLOGIES, INC., Alameda, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/418,049

(22) Filed: Jan. 27, 2017

(65) Prior Publication Data

US 2017/0219904 A1    Aug. 3, 2017

Related U.S. Application Data

(60) Provisional application No. 62/289,610, filed on Feb. 1, 2016.

(51) Int. Cl.
*G02F 1/15* (2006.01)
*G02F 1/155* (2006.01)
(Continued)

(52) U.S. Cl.
CPC ............ *G02F 1/163* (2013.01); *E06B 3/6715* (2013.01); *E06B 9/24* (2013.01); *G02B 5/23* (2013.01);
(Continued)

(58) Field of Classification Search
CPC ........ G02F 1/15; G02F 1/1508; G02F 1/1521; G02F 1/1525; G02F 1/1533; G02F 1/155;
(Continued)

(56) References Cited

U.S. PATENT DOCUMENTS 4,175,836 A  * 11/1979  Redman ................. G02F 1/163
                                                        345/105
4,902,108 A  *  2/1990  Byker ..................... B60R 1/088
                                                         252/600
(Continued)

FOREIGN PATENT DOCUMENTS

WO    WO2004001710 A1    12/2003

OTHER PUBLICATIONS

International Search Report and Written Opinion of the International Searching Authority for International Patent Application No. PCT/US2017/015398, dated May 19, 2017, 20 pages.
(Continued)

*Primary Examiner* — Loha Ben
(74) *Attorney, Agent, or Firm* — The Marbury Law Group PLLC

(57) ABSTRACT

An electrochromic system and method for controlling photochromic darkening of an electrochromic device, the system including an EC device, a control unit, a voltage detector, and a power supply. The EC device includes a working electrode, a counter electrode, and a solid-state polymer electrolyte disposed therebetween. The control unit is configured to control a sweep voltage applied between the working and counter electrodes, such that the sweep voltage is applied when an open circuit voltage (OCV) between the working and counter electrodes is less than a threshold voltage.

24 Claims, 12 Drawing Sheets

(51) Int. Cl.
  *G02F 1/157* (2006.01)
  *G02F 1/163* (2006.01)
  *E06B 9/24* (2006.01)
  *E06B 3/67* (2006.01)
  *G09G 3/38* (2006.01)
  *G02F 1/153* (2006.01)
  *G02B 5/23* (2006.01)
  *B32B 17/10* (2006.01)

(52) U.S. Cl.
  CPC ............... *G02F 1/15* (2013.01); *G02F 1/155* (2013.01); *G02F 1/1508* (2013.01); *G02F 1/1533* (2013.01); *G09G 3/38* (2013.01); *B32B 17/10477* (2013.01); *B32B 17/10486* (2013.01); *B32B 17/10513* (2013.01); *E06B 2009/2464* (2013.01); *G02F 2001/1519* (2013.01); *G02F 2001/1555* (2013.01); *G02F 2201/346* (2013.01)

(58) Field of Classification Search
  CPC ............ G02F 1/163; G02F 2001/1519; G02F 2001/1536; G02F 2001/1552; G02F 2001/1555; G02B 5/208; G02B 5/22; G02B 5/23; E06B 3/67; E06B 9/24; E06B 2009/2464; B32B 17/10467; B32B 17/10486; B32B 17/10513
  USPC ................. 359/241–244, 265–275; 345/105
  See application file for complete search history.

(56) References Cited

U.S. PATENT DOCUMENTS

| | | | |
|---|---|---|---|
| 5,365,365 A | 11/1994 | Ripoche et al. | |
| 5,654,736 A | 8/1997 | Green et al. | |
| 5,973,818 A | 10/1999 | Sjursen et al. | |
| 5,973,819 A | 10/1999 | Pletcher et al. | |
| 5,978,126 A | 11/1999 | Sjursen | |
| 6,297,900 B1 | 10/2001 | Tulloch et al. | |
| 6,346,447 B1 | 2/2002 | Geissels et al. | |
| 6,872,901 B2 | 3/2005 | Su et al. | |
| 7,935,940 B1 | 5/2011 | Smargiassi | |
| 8,427,733 B2 | 4/2013 | Gould et al. | |
| 8,441,707 B2* | 5/2013 | Lam | G02B 5/23 359/241 |
| 2006/0018000 A1 | 1/2006 | Greer | |
| 2010/0172010 A1 | 7/2010 | Gustavsson et al. | |
| 2011/0124116 A1 | 5/2011 | Wohlstadter et al. | |
| 2014/0268287 A1 | 9/2014 | Brown et al. | |
| 2015/0277202 A1 | 10/2015 | Mattox et al. | |
| 2016/0246153 A1 | 2/2016 | Garcia et al. | |
| 2017/0219905 A1* | 8/2017 | Garcia | G02F 1/155 |
| 2017/0219906 A1* | 8/2017 | Garcia | E06B 3/6715 |

OTHER PUBLICATIONS

Transmittal of International Preliminary Report on Patentability from the International Bureau for International Patent Application No. PCT/US2017/015398, dated Aug. 16, 2018, 16 pages.

* cited by examiner

ELECTROCHROMIC SYSTEM AND METHOD FOR CONTROLLING PHOTOCHROMIC DARKENING

FIELD

The present invention is generally directed to electrochromic (EC) systems configured to control photochromic darkening, and methods of controlling photochromic darkening in EC devices.

BACKGROUND OF THE INVENTION

Residential and commercial buildings represent a prime opportunity to improve energy efficiency and sustainability in the United States. The buildings sector alone accounts for 40% of the United States' yearly energy consumption (40 quadrillion BTUs, or "quads", out of 100 total), and 8% of the world's energy use. Lighting and thermal management each represent about 30% of the energy used within a typical building, which corresponds to around twelve quads each of yearly energy consumption in the US. Windows cover an estimated area of about 2,500 square km in the US and are a critical component of building energy efficiency as they strongly affect the amount of natural light and solar gain that enters a building. Recent progress has been made toward improving window energy efficiency through the use of inexpensive static coatings that either retain heat in cold climates (low emissive films) or reject solar heat gain in warm climates (near-infrared rejection films).

Currently, static window coatings can be manufactured at relatively low cost. However, these window coatings are static and not well suited for locations with varying climates. An electrochromic (EC) window coating overcomes these limitations by enhancing the window performance in all climates. EC window coatings undergo a reversible change in optical properties when driven by an applied potential. Traditional EC materials, such as $WO_3$, $Nb_2O_5$, and NiO, primarily modulate radiation in the visible spectral region, while radiation in the near-infrared (NIR) spectral region remains either unchanged or switches simultaneously with visible region of light. Further, performance of EC materials may degrade from use over time as a result of repeated exposure to radiation in the ultraviolet (UV) spectral region.

SUMMARY OF THE INVENTION

According to various embodiments, provided is an electrochromic (EC) system that includes an EC device, a control unit, a voltage detector, and a power supply. The EC device includes a working electrode, a counter electrode, and a solid-state polymer electrolyte disposed therebetween. The control unit is configured to selectively apply a sweep voltage between the working and counter electrodes, such that the sweep voltage is applied when an open circuit voltage (OCV) between the working and counter electrodes is less than a threshold voltage.

According to various embodiments, provided is a method of controlling photochromic darkening of an EC device including a working electrode, a counter electrode, and a solid-state polymer electrolyte disposed therebetween. The method includes detecting an open circuit voltage (OCV) between the working and counter electrodes of the EC device; and applying a sweep voltage between the working and counter electrodes, when the OCV is more negative than a threshold voltage.

According to various embodiments, provided is a method of controlling photochromic darkening of an EC device including a working electrode, a counter electrode, and a solid-state polymer electrolyte disposed therebetween. The method includes determining an amount of time since a voltage was applied to the EC device to change the transmissivity thereof; and applying a sweep voltage to the EC device, if determined amount of time exceeds a threshold time period.

According to various embodiments, provided is a method of controlling photochromic darkening of an EC device including a working electrode, a counter electrode, and a solid-state polymer electrolyte disposed therebetween. The method includes periodically applying a sweep voltage between the working and counter electrodes, such that an open circuit voltage between the working and counter electrodes is changed from a negative voltage to a positive voltage.

DETAILED DESCRIPTION OF THE EMBODIMENTS

Figure 1A:
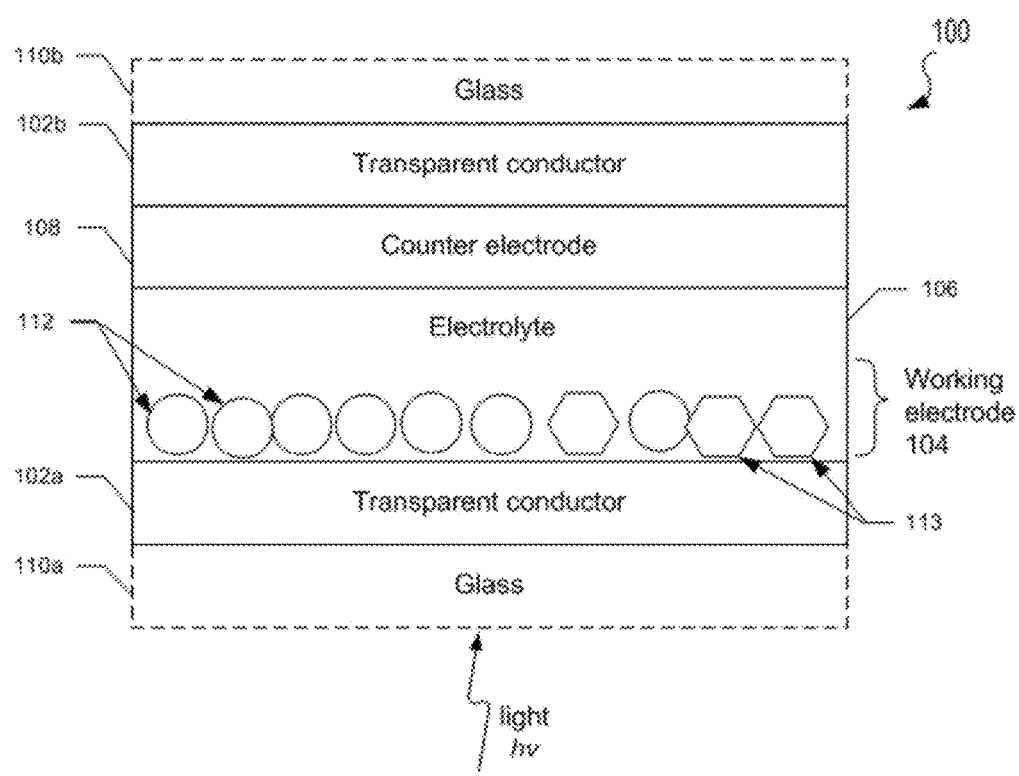
FIGS. 1A-1C are schematic representations of EC devices according to various embodiments.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being disposed "on" or "connected to" another element or layer, it can be directly on or directly connected to the other element or layer, or intervening elements or layers may be present. In contrast, when an element is referred to as being disposed "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

It is believed that photochromism in $WO_3$-based EC layers results from proton-coupled electron transfer under illumination by UV (or higher energy) photons. The generation of electron-hole pairs under such illumination may result in hole-based oxidation of proton-sources that are in contact with a $WO_3$ electrode. The concurrent transfer of an electron from the oxidized adjacent molecule coupled with insertion of a proton from the adjacent molecule into the $WO_3$ results in a reduction of the oxidation state of tungsten and a corresponding absorption feature (coloration). This unique feature has been exploited as an advantage for $WO_3$-based $H_2$ gas sensors, but is a detriment to $WO_3$-based EC devices, where the photochromic darkening is often irreversible.

While not intending to be bound to a particular theory, it is believed that under prolonged exposure to UV (or higher energy) radiation, an electrochromic (EC) device may undergo a visible darkening that mimics the EC darkening of the EC device. Further, it is believed that if the photoelectrochemically generated charge is not periodically swept away from the cathode of the EC device the charge will become trapped, eventually limiting the optical dynamic range of the EC device.

Accordingly, various embodiments disclosed herein provide voltage control systems and methods that control photochromic darkening in an EC device due to trapped photoelectrochemically generated charge by periodically applying a voltage to the EC device to sweep away the photoelectrochemically generated charge away from the working electrode (e.g., cathode) of the EC device.

In particular, because the photochromic effect in transition metal oxide bronze working electrodes, such as doped or undoped tungsten oxide (e.g. $WO_{3-x}$ where $0 \leq x \leq 0.33$), results in the separation of a photo-generated electron-hole pair, the present disclosure provides applied voltage schemes to modulate the efficiency of this process. For example, applied voltages greater than the open-circuit voltage between the working electrode and a counter electrode of an EC device can have multiple beneficial effects. One beneficial effect is a reduction in the energy difference between the valence band of metal oxide bronze (e.g., tungsten oxide) and the oxidation potential of adjacent molecules (e.g., molecules of adjacent organic electrolyte). This reduction then reduces the driving force for electron-hole separation and promotes recombination.

Another beneficial effect is that at sufficiently high potentials de-insertion of any donated protons becomes favorable, thereby sweeping out any charge responsible for coloration. The long-term re-distribution of protons throughout the working electrode due to a photo-generated charge may impede the extraction of the protons. Accordingly, the periodic removal or decrease of this photo-generated charge can improve the long-term durability of an EC device.

The open-circuit voltage ("OCV") of an EC device (e.g., the voltage between a working electrode including the transition metal oxide bronze and a counter electrode) can be used to determine the state of coloration/proton-insertion in the working electrode. As such, various embodiments provide a voltage control scheme where a specific positive potential relative to OCV is applied to the EC device, whenever the OCV drops below a specific value, to eliminate or decrease photogenerated (i.e., photochromic) darkening of the EC device due to due to trapped photoelectrochemically generated charge. In alternative embodiments, an even more simple control scheme is provided where a positive potential of a specific magnitude relative to OCV is applied periodically to an EC device to eliminate or decrease photogenerated (i.e., photochromic) darkening of the EC device due to due to trapped photoelectrochemically generated charge, after the EC device is allowed to remain in a state of coloration for an extended period of time.

Various embodiments disclosed herein provide EC nanostructured materials capable of selectively modulating radiation in near-infrared (NIR) and visible spectral regions. The material may include nanostructured doped transition metal oxides with ternary compounds of the type $A_xM_zO_y$. In various embodiment $A_xM_zO_y$ compounds, if it is assumed that z=1, then $0.08 \leq x \leq 0.5$ (preferably $0.25 \leq x \leq 0.35$), and $2 \leq y \leq 3$. In various embodiments, since the nanostructures may be non-uniform as a function of depth, x may represent an average doping content. To operate, the subject material may be fabricated into an electrode that will change optical properties after driven by an applied voltage.

In order to improve the performance of EC window coatings, selective modulation of NIR and visible spectra radiation, and avoidance of degrading effects of UV radiation, may be desired. Various embodiments may provide single-component EC nanostructured materials capable of selectively modulating NIR and visible spectral regions. Further, since certain spectral regions may damage the EC nanostructured material, the various embodiments may incorporate at least one protective material and/or protective layer to prevent such damage.

The various embodiments provide devices and methods for enhancing optical changes in windows using EC nanostructured materials fabricated into an electrode to form an EC device. In various embodiments, the material may undergo a reversible change in optical properties when driven by an applied potential. Based on the applied potential, the EC nanostructured materials may modulate NIR radiation (wavelength of around 780-2500 nm), as well as visible radiation (wavelength of around 400-780 nm). In an example, the device may include a first nanostructured material that modulates radiation in a portion of the NIR spectral region and in the visible spectral region, and a second nanostructured material that modulates radiation in an overlapping portion of the NIR spectral region such that the NIR radiation modulated by the device as a whole is enhanced and expanded relative to that of just the first nanostructured material. In various embodiments, the material may operate in multiple selective modes based on the applied potential.

Accordingly, the various embodiments may include at least one protective material to prevent or reduce damage to an EC nanostructured material that may result from repeated exposure to radiation in the UV (or higher) spectral region. In an example, a protective material may be used to form at least one barrier layer in the device that is positioned to block UV radiation from reaching the first nanostructured material and electrolyte. In another example, a protective material may be used to form a layer that is positioned to block free electron or hole charge carriers created in the electrolyte due to absorption of UV radiation by the nanostructured electrode material from migrating to that material, while allowing conduction of ions from the electrolyte (i.e., an electron barrier and ion conductor).

In various embodiments, control of individual operating modes for modulating absorption/transmittance of radiation in specific spectral regions may occur at different applied biases. Such control may provide users with the capability to achieve thermal management within buildings and other enclosures (e.g., vehicles, etc.), while still providing shading when desired.

Figure 1B:
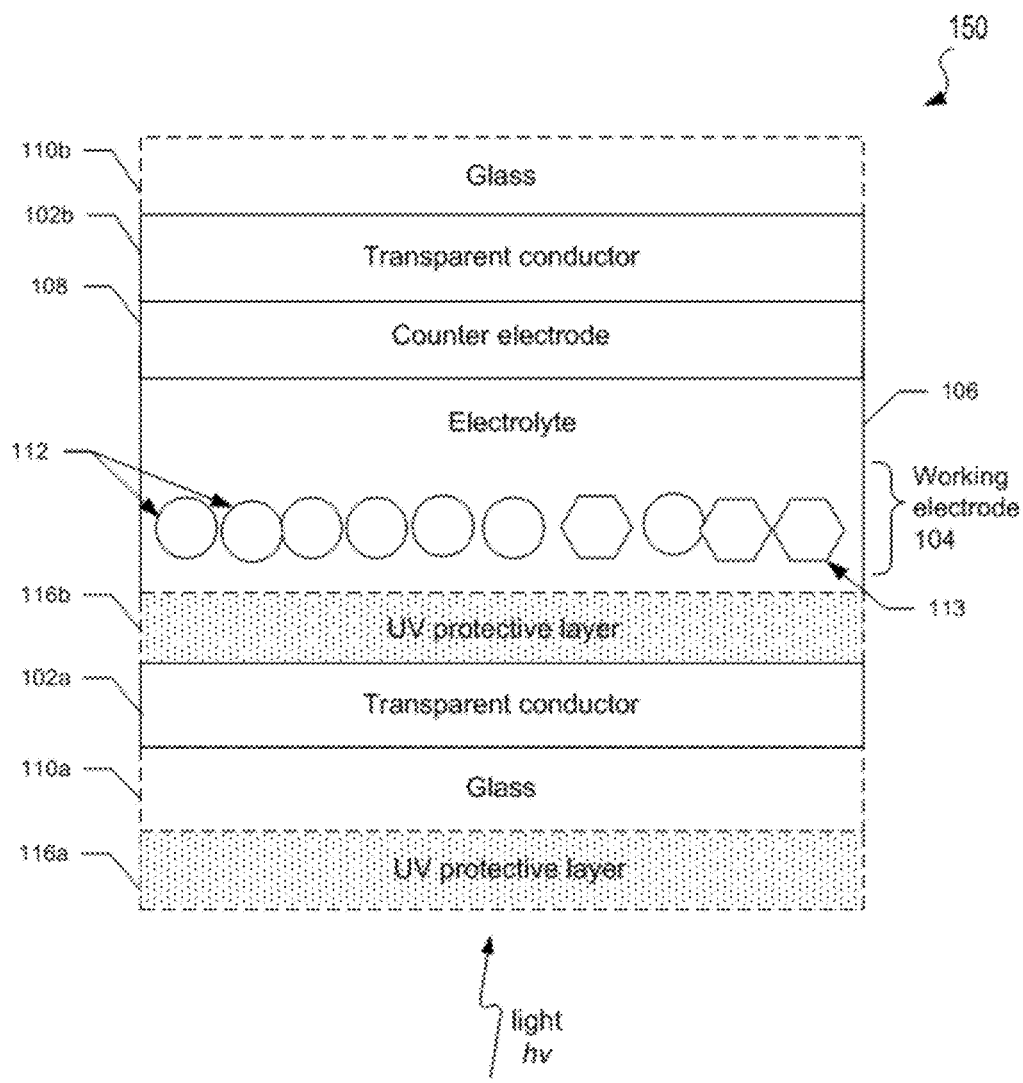
Figure 1C:
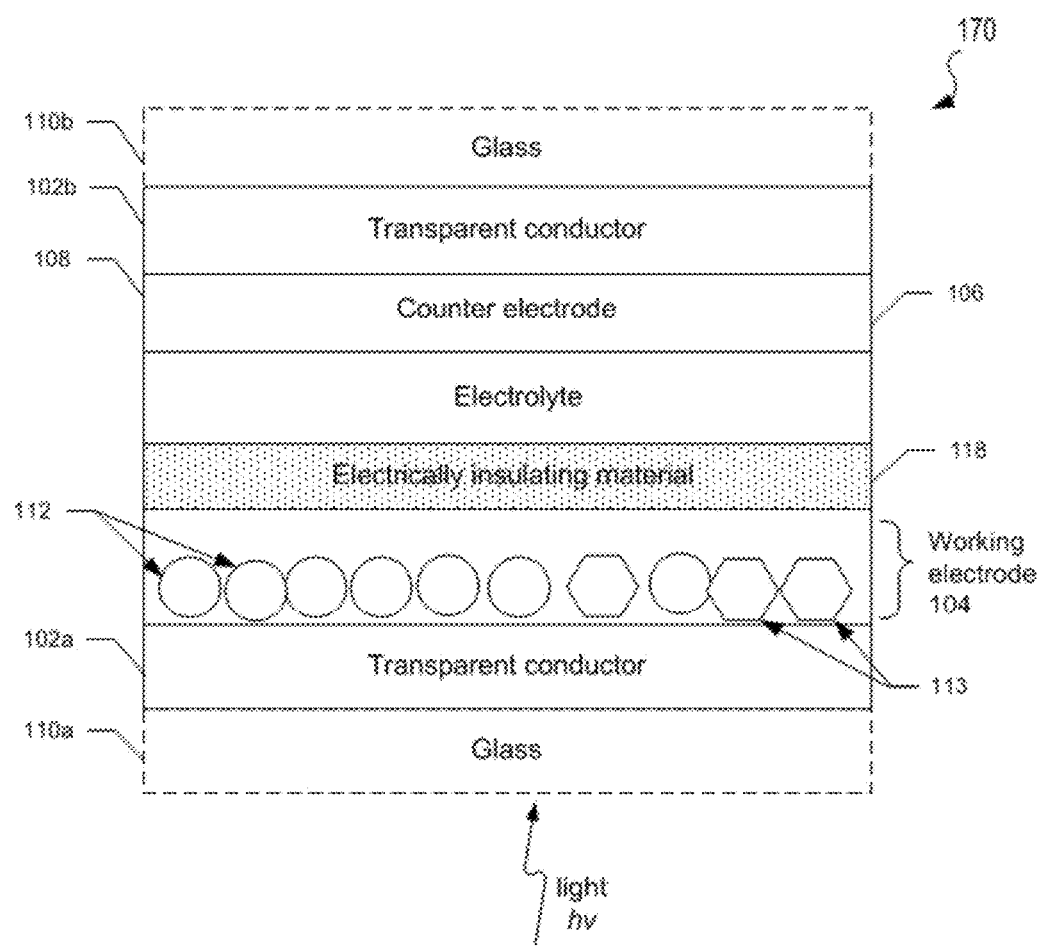

FIGS. 1A-1C illustrate exemplary EC devices. It should be noted that such EC devices may be oriented upside down or sideways from the orientations illustrated in FIGS. 1A-1C. Furthermore, the thickness of the layers and/or size of the components of the devices in FIGS. 1A-1C are not drawn to scale or in actual proportion to one another other, but rather are shown as representations.

In FIG. 1A, an exemplary EC device 100 may include a first transparent conductor layer 102a, a working electrode 104, a solid state electrolyte 106, a counter electrode 108, and a second transparent conductor layer 102b. Some embodiment EC devices may also include first and second light transmissive substrates 110a, 110b respectively positioned in front of the first transparent conductor layer 102a and/or positioned behind the second transparent conductor layer 102b. The first and second substrates 110a, 110b may be formed of a transparent material such as glass or plastic.

The first and second transparent conductor layers 102a, 102b may be formed from transparent conducting films fabricated using inorganic and/or organic materials. For example, the transparent conductor layers 102a, 102b may include inorganic films of transparent conducting oxide (TCO) materials, such as indium tin oxide (ITO) or fluorine doped tin oxide (FTO). In other examples, organic films in transparent conductor layers 102a, 102b may include graphene and/or various polymers.

In the various embodiments, the working electrode 104 may include nanostructures 112 of a doped or undoped transition metal oxide bronze, and optionally nanostructures 113 of a transparent conducting oxide (TCO) composition shown schematically as circles and hexagons for illustration purposes only. As discussed above, the thickness of the layers of the device 100, including and the shape, size and scale of nanostructures is not drawn to scale or in actual proportion to each other, but is represented for clarity. In the various embodiments, nanostructures 112, 113 may be embedded in an optically transparent matrix material or provided as a packed or loose layer of nanostructures exposed to the electrolyte.

In the various embodiments, the doped transition metal oxide bronze of nanostructures 112 may be a ternary composition of the type AxMzOy, where M represents a transition metal ion species in at least one transition metal oxide, and A represents at least one dopant. Transition metal oxides that may be used in the various embodiments include, but are not limited to any transition metal oxide which can be reduced and has multiple oxidation states, such as niobium oxide, tungsten oxide, molybdenum oxide, vanadium oxide, titanium oxide and mixtures of two or more thereof. In one example, the nanostructured transition metal oxide bronze may include a plurality of doped or undoped tungsten oxide ($WO_{3-x}$) nanoparticles, where $0 \leq x \leq 0.33$, such as $0 \leq x \leq 0.1$.

In various embodiments, the at least one dopant species may be a first dopant species that, upon application of a particular first voltage range, causes a first optical response. The applied voltage may be, for example, a negative bias voltage. Specifically, the first dopant species may cause a surface plasmon resonance effect on the transition metal oxide by creating a significant population of delocalized electronic carriers. Such surface plasmon resonance may cause absorption of NIR radiation at wavelengths of around 780-2000 nm, with a peak absorbance at around 1200 nm. In various embodiments, the specific absorbances at different wavelengths may be varied/adjusted based other factors (e.g., nanostructure shape, size, etc.), discussed in further detail below. In the various embodiments, the first dopant species may be an ion species selected from the group of cesium, rubidium, and lanthanides (e.g., cerium, lanthanum, praseodymium, neodymium, promethium, samarium, europium, gadolinium, terbium, dysprosium, holmium, erbium, thulium, ytterbium, and lutetium).

In various embodiments, the dopant may include a second dopant species that causes a second optical response based upon application of a voltage within a different, second particular range. The applied voltage may be, for example, a negative bias voltage. In an embodiment, the second dopant species may migrate between the solid state electrolyte 106 and the nanostructured transition metal oxide bronze of the working electrode 104 as a result of the applied voltage. Specifically, the application of voltage within the particular range may cause the second dopant species to intercalate and deintercalate the transition metal oxide structure. In this manner, the second dopant may cause a change in the oxidation state of the transition metal oxide, which may cause a polaron effect and a shift in the lattice structure of the transition metal oxide. This shift may cause absorption of visible radiation, for example, at wavelengths of around 400-780 nm.

In various embodiments, the second dopant species may be an intercalation ion species selected from the group of lanthanides (e.g., cerium, lanthanum, praseodymium, neodymium, promethium, samarium, europium, gadolinium, terbium, dysprosium, holmium, erbium, thulium, ytterbium, and lutetium), alkali metals (e.g., lithium, sodium, potassium, rubidium, and cesium), and alkali earth metals (e.g., beryllium, magnesium, calcium, strontium, and barium). In other embodiments, the second dopant species may include a charged proton species.

In various embodiments, nanostructures 113 may optionally be mixed with the doped transition metal oxide bronze nanostructures 112 in the working electrode 104. In the various embodiments, the nanostructures 113 may include at least one TCO composition, which prevents UV radiation from reaching the electrolyte and generating electrons. In an example embodiment, the nanostructures 113 may include an indium tin oxide (ITO) composition, which may be a solid solution of around 60-95 wt % (e.g., 85-90 wt %) indium(III) oxide ($In_2O_3$) and around 5-40 wt % (e.g., 10-15 wt %) tin(IV) oxide ($SnO_2$). In another example embodiment, the nanostructures 113 may include an aluminum-doped zinc oxide (AZO) composition, which may be a solid solution of around 99 wt % zinc oxide (ZnO) and around 2 wt % aluminum(III) oxide ($Al_2O_3$). Additional or alternative TCO compositions that may be used to form nanostructures 113 in the various embodiments include, but are not limited to, indium oxide, zinc oxide and other doped zinc oxides such as gallium-doped zinc oxide and indium-doped zinc oxide.

The TCO composition of nanostructures 113 may be transparent to visible light and, upon application of the first voltage, may modulate absorption of NIR radiation at wavelengths of around 1200-2500 nm, with peak absorbance around 2000 nm (e.g., at a longer peak wavelength than the bronze nanoparticles 112, but with overlapping absorption bands). In particular, application of the first voltage may cause an increase in free electron charge carriers, and therefore cause a surface plasmon resonance effect in at least one TCO composition of nanostructures 113. In an embodiment in which the TCO composition is ITO, the surface plasmon resonance effect may be caused by oscillation of free electrons produced by the replacement of indium ions (In$^{3+}$) with tin ions (Sn$^{4+}$). Similar to the transition metal oxide bronze, such surface plasmon resonance may cause a change in absorption properties of the TCO material. In some embodiments, the change in absorption properties may be an increase in absorbance of NIR radiation at wavelengths that overlaps with that of the nanostructures 112. Therefore, the addition of TCO composition nanostructures 113 to the working electrode 104 may serve to expand the range of NIR radiation absorbed (e.g., at wavelengths of around 780-2500 nm) compared to that of the nanostructures 112 alone (e.g., at wavelengths of around 780-2000 nm), and to enhance absorption of some of that NIR radiation (e.g., at wavelengths of around 1200-2000 nm).

Based on these optical effects, the nanostructure 112 and optional nanostructure 113 of the working electrode may progressively modulate transmittance of NIR and visible radiation as a function of applied voltage by operating in at least three different modes. For example, a first mode may be a highly solar transparent ("bright") mode in which the working electrode 104 is transparent to NIR radiation and visible light radiation. A second mode may be a selective-IR blocking ("cool") mode in which the working electrode 104 is transparent to visible light radiation but absorbs NIR radiation. A third mode may be a visible blocking ("dark") mode in which the working electrode 104 absorbs radiation in the visible spectral region and at least a portion of the NIR spectral region. In an example, application of a first voltage having a negative bias may cause the EC device to operate in the cool mode, blocking transmittance of NIR radiation at wavelengths of around 780-2500 nm. In another example, application of a second negative bias voltage having a higher absolute value than the first voltage may cause the EC device to operate in the dark state, blocking transmittance of visible radiation (e.g., at wavelengths of around 400-780 nm) and NIR radiation at wavelengths of around 780-1200 nm. In another example, application of a third voltage having a positive bias may cause the EC device to operate in the bright state, allowing transmittance of radiation in both the visible and NIR spectral regions. In various embodiments, the applied voltage may be between −5V and 5V, preferably between −2V and 2V. For example, the first voltage may be −0.25V to −0.75V, and the second voltage may be −1V to −2V. In another example, the absorbance of radiation at a wavelength of 800-1500 nm by the EC device may be at least 50% greater than its absorbance of radiation at a wavelength of 450-600 nm.

Alternatively, the nanostructure 112 and optional nanostructure 113 of the working electrode may modulate transmittance of NIR and visible radiation as a function of applied voltage by operating in two different modes. For example, a first mode may be a highly solar transparent ("bright") mode in which the working electrode 104 is transparent to NIR radiation and visible light radiation. A second mode may be a visible blocking ("dark") mode in which the working electrode 104 absorbs radiation in the visible spectral region and at least a portion of the NIR spectral region. In an example, application of a first voltage having a negative bias may cause the EC device to operate in the dark mode, blocking transmittance of visible and NIR radiation at wavelengths of around 780-2500 nm. In another example, application of a second voltage having a positive bias may cause the EC device to operate in the bright mode, allowing transmittance of radiation in both the visible and NIR spectral regions. In various embodiments, the applied voltage may be between −2V and 2V. For example, the first voltage may be −2V, and the second voltage may be 2V.

In various embodiments, the solid state electrolyte 106 may include at least a polymer material and a plasticizer material, such that electrolyte may permeate into crevices between the transition metal oxide bronze nanoparticles 112 (and/or nanoparticles 113 if present). The term "solid state," as used herein with respect to the electrolyte 106, refers to a polymer-gel and/or any other non-liquid material. In some embodiments, the solid state electrolyte 106 may further include a salt containing, for example, an ion species selected from the group of lanthanides (e.g., cerium, lanthanum, praseodymium, neodymium, promethium, samarium, europium, gadolinium, terbium, dysprosium, holmium, erbium, thulium, ytterbium, and lutetium), alkali metals (e.g., lithium, sodium, potassium, rubidium, and cesium), and alkali earth metals (e.g., beryllium, magnesium, calcium, strontium, and barium). In an example embodiment, such salt in the solid state electrolyte 106 may contain a lithium and/or sodium ions. In some embodiments, the solid state electrolyte 106 may initially contain a solvent, such as butanol, which may be evaporated off once the EC device is assembled. In some embodiments, the solid state electrolyte 106 may be around 40-60 wt % plasticizer material, preferably around 50-55 wt % plasticizer material. In an embodiment, the plasticizer material may include at least one of tetraglyme and an alkyl hydroperoxide. In an embodiment, the polymer material of the solid state electrolyte 106 may be polyvinylbutyral (PVB), and the salt may be lithium bis(trifluoromethane). In other embodiments, the solid state electrolyte 106 may include at least one of lithium phosphorus oxynitride (LiPON) and tantalum pentoxide (Ta$_2$O$_5$).

In some embodiments, the electrolyte 106 may include a sacrificial redox agent (SRA). Suitable classes of SRAs may include, but are not limited to, alcohols, nitrogen heterocycles, alkenes, and functionalized hydrobenzenes. Specific examples of suitable SRAs may include benzyl alcohol, 4-methylbenzyl alcohol, 4-methoxybenzyl alcohol, dimethylbenzyl alcohol (3,5-dimethylbenzyl alcohol, 2,4-dimethylbenzyl alcohol etc.), other substituted benzyl alcohols, indoline, 1,2,3,4-tetrahydrocarbazole, N,N-dimethylaniline, 2,5-dihydroanisole, etc. In various embodiments, the SRA molecules may create an air stable layer that does not require an inert environment to maintain charge.

Polymers that may be part of the electrolyte 106 may include, but are not limited to, poly(methyl methacrylate) (PMMA), poly(vinyl butyral-co-vinyl alcohol-co-vinyl acetate) (PVB), poly(ethylene oxide) (PEO), fluorinated co-polymers such as poly(vinylidene fluoride-co-hexafluoropropylene), poly(acrylonitrile) (PAN), poly(vinyl alcohol) (PVA), etc. Plasticizers that may be part of the polymer electrolyte formulation include, but are not limited to, glymes (tetraglyme, triglyme, diglyme etc.), propylene carbonate, ethylene carbonate, ionic liquids (1-ethyl-3-methylimidazolium tetrafluoroborate, 1-butyl-3-methylimidazolium hexafluorophosphate, 1-butyl-3-methylimidazolium bis(trifluoromethane sulfonyl) imide, 1-butyl-1-methyl-pyrrolidinium bis(trifluoromethane sulfonyl)imide, etc.), N,N-dimethylacetamide, and mixtures thereof.

In some embodiments, the electrolyte 106 may include, by weight, 10-30% polymer, 40-80% plasticizer, 5-25% lithium salt, and 0.5-10% SRA.

The counter electrode 108 of the various embodiments should be capable of storing enough charge to sufficiently balance the charge needed to cause visible tinting to the nanostructured transition metal oxide bronze in the working electrode 104. In various embodiments, the counter electrode 108 may be formed as a conventional, single component film, a nanostructured film, or a nanocomposite layer.

In some embodiments, the counter electrode 108 may be formed from at least one passive material that is optically transparent to both visible and NIR radiation during the applied biases. Examples of such passive counter electrode materials may include $CeO_2$, $CeVO_2$, $TiO_2$, indium tin oxide, indium oxide, tin oxide, manganese or antimony doped tin oxide, aluminum doped zinc oxide, zinc oxide, gallium zinc oxide, indium gallium zinc oxide, molybdenum doped indium oxide, $Fe_2O_3$, and/or $V_2O_5$. In other embodiments the counter electrode 108 may be formed from at least one complementary material, which may be transparent to NIR radiation but which may be oxidized in response to application of a bias, thereby causing absorption of visible light radiation. Examples of such complementary counter electrode materials may include $Cr_2O3$, $MnO_2$, $FeO_2$, $CoO_2$, $NiO_2$, $RhO_2$, or $IrO_2$. The counter electrode materials may include a mixture of one or more passive materials and/or one or more complementary materials described above.

Without being bound to any particular theory, it is believed that the application of a first voltage in the various embodiments may cause the interstitial dopant species (e.g., cesium) in the crystal structure of the transition metal oxide bronze to have a greater amount of free carrier electrons and/or to cause the interstitial dopant species (e.g., lithium ions from the electrolyte) to perform non-faradaic capacitive or pseudo-capacitive charge transfer on the surface of the nanostructures 112, which may cause the surface plasmon resonance effect to increase the absorption of NIR radiation. In this manner, the absorption properties of the transition metal oxide bronze characteristics may change (i.e., increased absorption of NIR radiation) upon application of the first voltage. Further, application of a second voltage having a higher absolute value than the first voltage in the various embodiments may cause faradaic intercalation of an intercalation dopant species (e.g., lithium ions) from the electrolyte into the transition metal oxide nanostructures. It is believed that the interaction of this dopant species provides interstitial dopant atoms in the lattice which creates a polaron effect. In this manner, the lattice structure of transition metal oxide nanoparticles may experience a polaron-type shift, thereby altering its absorption characteristics (i.e., shift to visible radiation) to block both visible and near infrared radiation.

In some embodiments, in response to radiation of certain spectral regions, such as UV (e.g., at wavelengths of around 10-400 nm) may cause excitons to be generated in the polymer material of the solid state electrolyte 106. The UV radiation may also excite electrons in the doped transition metal oxide bronze to move into the conduction band, leaving holes in the valence band. The generated excitons in the polymer material may dissociate to free carriers, the electrons of which may be attracted to the holes in the valence band in the doped transition metal oxide bronze (e.g., cesium-doped tungsten trioxide ($Cs_xWO_3$)) of nanoparticles 112. Since electrochemical reduction of various transition metal oxide bronzes by such free electron charge carriers may degrade their performance (i.e., from unwanted coloration of the transition metal oxide bronze), embodiment devices may include one or more layer of a protective material to prevent UV radiation from reaching the solid state electrolyte 106, in addition to or instead of nanostructures 113 mixed into the working electrode.

FIG. 1B illustrates an embodiment EC device 150 that addresses degradation of the doped transition metal oxide bronze nanostructures 112. Similar to the EC device 100 shown in FIG. 1A, the EC device 150 may include a first transparent conductor layer 102a, a working electrode 104, a solid state electrolyte 106, a counter electrode 108, a second transparent conductor layer 102b, and first and/or second light transmissive substrates 110a, 110b. In addition, the EC device 150 may include one or more protective layers 116a, 116b made of a material that absorbs UV radiation. In an example embodiment, the EC device 150 may include a first protective layer 116a disposed between the first substrate 110a and the first transparent conductor layer 102a. The EC device 150 may optionally include a second protective layer 116b disposed between the second substrate 110b and the second transparent conductor layer 102b. Alternatively, the UV protective layer 116a may be disposed on the outer surface of the first substrate 110a, or may be disposed between the first transparent conductor 102a and the working electrode 104. In other words, the first and/or second UV protective layers 116a, 116b may be disposed between any of the layers of the EC device 150, such that UV radiation is substantially prevented from reaching the working electrode 104.

The UV radiation absorbing material of the protective layers 116a, 116b of the various embodiments may be any of a number of barrier films. For example, the first protective layer 116a may be a thin film of at least one TCO material, which may include a same as or different from TCO compositions in the nanostructures 113. In an example embodiment, the first protective layer 116a of the device 150 may be an ITO thin film, and therefore capable of absorbing UV radiation by band-to-band absorption (i.e., absorption of a UV photon providing enough energy to excite an electron from the valence band to the conduction band). In another example embodiment, the device may include the TCO nanostructures 113 made of ITO, as well as the first protective layer 116a composed of an ITO thin film. Alternatively, the TCO nanostructures 113 may be in the form of the separate second protective layer 116b disposed between the transition metal oxide bronze nanoparticles 112 and the transparent conductor layer 102a. In some embodiments, the UV radiation absorbing materials of protective layers 116a, 116b may include organic or inorganic laminates.

In another embodiment, at least one UV protective layer, such as protective layer 116a in FIG. 1B, may be a UV radiation reflector made of a high index transparent metal oxide. Since birds can see radiation in the UV range, a UV reflector may be implemented in embodiments positioned as outside windows in order to prevent birds from hitting the windows. In some other embodiments, UV radiation absorbing organic molecules and/or inorganic UV radiation absorbing nanoparticles (e.g., zinc oxide, indium oxide, ITO, etc.) may be incorporated within the electrolyte 106 material.

FIG. 1C illustrates another embodiment EC device 170 that addresses degradation of the doped transition metal oxide bronze nanostructures 112 by controlling the effects of the electron charge carriers generated in the electrolyte from exposure to UV radiation. Similar to devices 100 and 150 discussed above with respect to FIGS. 1A and 1B respectively, the EC device 170 may include a first transparent conductor layer 102a, a working electrode 104, a solid state electrolyte 106, a counter electrode 108, a second transparent conductor layer 102b, and first and/or second light transmissive substrates 110a, 110b. In addition, EC device 170 may include a protective layer 118 positioned between the working electrode 104 and the electrolyte 106. The protective layer 118 may be composed of one or more ionically conductive and electrically insulating material.

As discussed above, without being bound to any particular theory, it is believed that the migration of intercalation ions between the electrolyte 106 and the working electrode 104 is responsible for at least some of the device's capability to modulate spectral absorption. Therefore, in order to maintain operability of the device, the electrically insulating material used to form the protective layer 118 should also be ionically conductive. That is, the material of the protective layer 118 may prevent or reduce free electrons in the solid state electrolyte 106 from reducing the transition oxide bronze of nanoparticles 112, while allowing the diffusion of ions of an intercalation dopant species (e.g., Na, Li, etc.) between the electrolyte 106 and working electrode 104. In an example embodiment, the electrically insulating material that makes up the protective layer 118 may be tantalum oxide, such as tantalum pentoxide ($Ta_2O_5$), which blocks migration of electrons from the electrolyte 106 while allowing diffusion of the intercalation dopant species ions (e.g., lithium ions) from the electrolyte 106. In this manner, degradation of the transition metal oxide bronze is reduced or prevented by controlling the effect of the absorbed UV radiation in addition to or instead of instead of blocking its absorption. Other example materials that may be used to form the protective layer 118 in addition to or instead of tantalum pentoxide may include, without limitation, strontium titanate ($SrTiO_3$), zirconium dioxide ($ZrO_2$), indium oxide, zinc oxide, tantalum carbide, niobium oxide, and various other dielectric ceramics having similar electrical and/or crystalline properties to tantalum pentoxide.

In an alternative embodiment, instead of or in addition to the protective layer 118, the nanostructures 112 may each be encapsulated in a shell containing an electrically insulating and ionically conductive material, which may be the same as or different from the material of the protective layer 118 (e.g., tantalum oxide, strontium titanate, zinc oxide, indium oxide, zirconium oxide, tantalum carbide, or niobium oxide).

In an example embodiment, each nanostructure 112 may have a core of cubic or hexagonal unit cell lattice structure tungsten bronze, surrounded by a shell of tantalum pentoxide.

In some embodiments, the electrolyte 106 may include a polymer that reduces damage to the device due to UV radiation. The polymer may be any of a number of polymers that are stable upon absorption of UV radiation (e.g., no creation of proton/electron pairs). Examples of such polymers may include, but are not limited to, fluorinated polymers without hydroxyl (—OH) groups (e.g., polyvinylidene difluoride (PVDF)).

In another embodiment, a positive bias may be applied to the counter electrode 108 to draw UV radiation generated electrons from the electrolyte 106 to the counter electrode 108 in order to reduce or prevent electrons from the electrolyte 106 from moving to the working electrode 104 to avoid the free electron-caused coloration of the doped transition metal oxide bronze in the working electrode 104.

In another embodiment, a device may include more than one of, such as any two of, any three of, or all four of: (i) a protective layer of electrically insulating material (e.g., protective layer 118 or protective material shells around the bronze nanoparticles), (ii) one or more protective layer of UV radiation absorbing material (e.g., protective layer(s) 116a and/or 116b in FIG. 1B and/or UV radiation absorbing organic molecules and/or inorganic UV radiation absorbing nanoparticles incorporated within the electrolyte 106 material), (iii) electrolyte polymer that is stable upon absorption of UV radiation, and/or (iv) application of positive bias to the counter electrode 108. In various embodiments, the nanostructures 113 may be included in or omitted from EC devices 150, 170.

In another embodiment, the protective layer(s) 116a and/or 116b may comprise a stack of metal oxide layers. Alternatively, the stack may comprise a separate component that is provided instead of or in addition to the layer(s) 116a and/or 116b. The stack may provide improvement in the reflected color of the EC device. Prior art devices generally have a reddish/purplish color when viewed in reflection. The stack may comprise index-matched layers between the glass and transparent conductive oxide layer to avoid the reddish/purplish reflected color. As noted above, the index-matched layer can serve as the UV absorber or be used in addition to another UV absorber. The stack may comprise a zinc oxide based layer (e.g., ZnO or AZO) beneath an indium oxide based layer (e.g., indium oxide or ITO).

Compared to nanocomposite EC films, the various embodiments may involve similar production by utilizing a single nanostructured material in the working electrode to achieve the desired spectral absorption control in both NIR and visible regions, and another nanostructured material to enhance and expand such control in the NIR region. Further, the various embodiments may provide one or more additional layer(s) of a protective material to minimize degradation of the single nanostructured material.

In some embodiments, the working electrode and/or the counter electrode may additionally include at least one material, such as an amorphous nano structured material, that enhances spectral absorption in the lower wavelength range of the visible region. In some embodiments, the at least one amorphous nanostructured material may be at least one nanostructured amorphous transition metal oxide.

In particular, the amorphous nano structured materials may provide color balancing to the visible light absorption that may occur due to the polaron-type shift in the spectral absorption of the doped-transition metal oxide bronze. As discussed above, upon application of the second voltage having a higher absolute value, the transition metal oxide bronze may block (i.e., absorb) radiation in the visible range. In various embodiments, the absorbed visible radiation may have wavelengths in the upper visible wavelength range (e.g., 500-700 nm), which may cause the darkened layer to appear blue/violet corresponding to the un-absorbed lower visible wavelength range (e.g., around 400-500 nm). In various embodiments, upon application of the second voltage, the at least one nanostructured amorphous transition metal oxide may absorb complementary visible radiation in the lower visible wavelength range (e.g., 400-500 nm), thereby providing a more even and complete darkening across the visible spectrum with application of the second voltage. That is, use of the amorphous nanostructured material may cause the darkened layer to appear black.

In some embodiments, at least one nanostructured amorphous transition metal oxide may be included in the working electrode 104 in addition to the doped-transition metal oxide bronze nanostructures 112 and the optional TCO nanostructures 113. An example of such material in the working electrode 104 may be, but is not limited to, nanostructured amorphous niobium oxide, such as niobium(II) monoxide (NbO) or other niobium oxide materials (e.g., $NbO_x$). In some embodiments, the counter electrode 108 may include, as a complementary material, at least one nanostructured amorphous transition metal oxide. That is, in addition to optically passive materials, the counter electrode 108 may include at least one material for color balancing (i.e., complementing) the visible radiation absorbed in the working electrode (i.e., by the transition metal oxide bronze. An example of such material in the counter electrode 108 may be, but is not limited to, nanostructured amorphous nickel oxide, such as nickel(II) oxide (NiO) or other nickel oxide materials (e.g., $NiO_x$).

In the various embodiments, nanostructures that form the working and/or counter electrode, including the at least one amorphous nanostructured material, may be mixed together in a single layer. An example of a mixed layer is shown in FIG. 1A with respect to transition metal oxide bronze nanostructures 112 and TCO nanostructures 113. Alternatively, nano structures that form the working and/or counter electrode, including the at least one amorphous nanostructured material, may be separately layered according to composition. For example, a working electrode may include a layer of amorphous $NbO_x$ nanostructures, a layer of transition metal oxide bronze nanostructures, and a layer of ITO nanostructures, in any of a number of orders.

The nanostructured transition metal oxide bronzes that may be part of the working electrode 104 in various embodiment devices can be formed using any of a number of low cost solution process methodologies. For example, solutions of $Nb:TiO_2$ and $Cs_xWO_3$ may be synthesized using colloidal techniques. Compared to other synthetic methodologies, colloidal synthesis may offer a large amount of control over the nanostructure size, shape, and composition of the nanostructured transition metal oxide bronze. After deposition, a nanostructured transition metal oxide bronze material in the working electrode 104 may be subjected to a thermal post treatment in air to remove and cap ligands on the surface of the nanostructures.

In various embodiments, nanostructured amorphous transition metal oxide materials may be formed at room temperature from an emulsion and an ethoxide precursor. For example, procedures used to synthesize tantalum oxide nanoparticles that are described in "Large-scale synthesis of bioinert tantalum oxide nanoparticles for X-ray computed tomography imaging and bimodal image-guided sentinel lymph node mapping" by MH Oh et al. (J Am Chem Soc. 2011 Apr. 13; 133(14):5508-15), incorporated by reference herein, may be similarly used to synthesize amorphous transition metal oxide nanoparticles. For example, an overall synthetic process of creating the nanoparticle, as described in Oh et al., may adopted from the microemulsion synthesis of silica nanoparticles. In such process, a mixture of cyclohexane, ethanol, surfactant, and a catalysis for the sol-gel reaction may be emulsified. The ethoxide precursor may be added to the emulsion, and uniform nanoparticles may be formed by a controlled-sol gel reaction in the reverse micelles at room temperature within around 5 minutes. The sol-gel reaction may be catalyzed, for example, by NaOH.

In some embodiments, the nanostructured amorphous transition metal oxide may be sintered at a temperature of at least 400° C. for at least 30 minutes, such as 400 to 600° C. for 30 to 120 minutes to form a porous web. In an example embodiment, the porous web may be included in a working electrode 104, with the tungsten bronze nanoparticles and ITO nanoparticles incorporated in/on the web. Alternatively, the sintering step may be omitted and the nano structured amorphous transition metal oxide may remain in the device in the form of nanoparticles having amorphous structure. In this embodiment, the device containing the nanostructured amorphous transition metal oxide may include or may omit the protective layer(s) 116a, 116b, and/or 118, the UV stable electrolyte polymer, and the application of positive bias to the counter electrode.

EC responses of prepared nanostructured transition metal oxide bronze materials (e.g., $Cs_xWO_3$, $Nb:TiO_2$, etc.) may be demonstrated by spectro-electrochemical measurements.

In various embodiments, the shape, size, and doping levels of nanostructured transition metal oxide bronzes may be tuned to further contribute to the spectral response by the device. For instance, the use of rod versus spherical nanostructures 112 may provide a wider level of porosity, which may enhance the switching kinetics. Further, a different range of dynamic plasmonic control may occur for nanostructures with multiple facets, such as at least 20 facets.

Various embodiments may also involve alternation of the nanostructures 112 that form the working electrode 104. For example, the nanostructures may be nanoparticles of various shapes, sizes and/or other characteristics that may influence the absorption of NIR and/or visible light radiation. In some embodiments, the nanostructures 112 may be isohedrons that have multiple facets, preferably at least 20 facets.

In some embodiments, the transition metal oxide bronze nanostructures 112 may be a combination of nanoparticles having a cubic unit cell crystal lattice ("cubic nanoparticles") and nanoparticles having a hexagonal unit cell crystal lattice ("hexagonal nanoparticles"). Each unit cell type nanoparticle contributes to the performance of the working electrode 104. For example, the working electrode 104 may include both cubic and hexagonal cesium doped tungsten oxide bronze nanoparticles. In alternative embodiments, the working electrode 104 may include either cubic or hexagonal cesium doped tungsten oxide nanoparticles. For example, the working electrode 104 may include cubic cesium-doped tungsten oxide (e.g. $Cs_1W_2O_{6-x}$) nanoparticles and amorphous niobium oxide nanoparticles or hexagonal cesium-doped tungsten oxide (e.g. $Cs_{0.29}W_1O_3$) nanoparticles without niobium oxide. In alternative embodiments, the working electrode 104 may include undoped tungsten oxide (e.g. $WO_{3-x}$) nanoparticles where $0 \leq X \leq 0.1$.

For example, upon application of the first (i.e., lower absolute value) voltage described above, the hexagonal bronze nanostructures 112 may block NIR radiation having wavelengths in the range of around 800-1700 nm, with the peak absorption at the mid-NIR wavelength of around 1100 nm. The cubic bronze nanostructures 112 may block NIR radiation having wavelengths in the close-NIR range with the peak absorption of around 890 nm. The indium oxide based (including ITO) and/or zinc oxide based (including AZO) nanostructures 113 may be included in the working electrode 104 to block the higher wavelength IR radiation upon application of the first voltage. Thus, the cubic bronze and hexagonal bronze nanostructures may block respective close and mid-NIR radiation (e.g., using the Plasmon effect), while the nanostructures 113 may block the higher wavelength IR radiation.

Upon application of the second (i.e., higher absolute value) voltage described above, the cubic bronze nanostructures 112 may block visible and NIR radiation having wavelengths in the range of around 500-1500 nm, with the peak absorption at the close-NIR wavelength of around 890 nm (e.g., using the polaron effect). Optionally, the amorphous niobium oxide may also be added to the working electrode 104 to block the short wavelength visible radiation (e.g., 400 to 500 nm wavelength).

The cubic bronze nanostructures block visible radiation via the polaron effect at a lower applied voltage than the hexagonal bronze nanostructures. Thus, the second voltage may have an absolute value which is below the value at which the hexagonal bronze nano structures block visible radiation via the polaron effect such that these nanostructures do not contribute to blocking of visible radiation. Alternatively, the second voltage may have an absolute value which is above the value at which the hexagonal bronze nanostructures block visible radiation via the polaron effect such that these nanostructures also contribute to blocking of visible radiation.

Embodiment nanoparticles that form the working electrode 104 may be around 4-6 nm in diameter, and may include 40 to 70 wt %, such as around 50 wt % cubic tungsten bronze nanostructures, 15 to 35 wt %, such as around 25 wt % hexagonal tungsten bronze nanostructures, and optionally 15 to 35 wt %, such as around 25 wt % ITO nanostructures. In some embodiments, in order to achieve color balancing as described above, the nanoparticles that form the working electrode 104 may optionally include around 5-10 wt % amorphous $NbO_x$ nanostructures in place of cubic tungsten bronze nanostructures. In this embodiment, the device containing two types of bronze nanoparticles may include or may omit the protective layer(s) 116a, 116b, and 118, the UV stable electrolyte polymer, the application of positive bias to the counter electrode, and the amorphous niobium oxide.

In summary, the working electrode 104 may include one or more of the following components:

(a) metal oxide bronze nanostructures 112 having (i) a cubic, (ii) hexagonal, or (iii) a combination of cubic and hexagonal unit cell lattice structure;

(b) protective (i) indium oxide based (including ITO) and/or zinc oxide based (including AZO) nanostructures 113;

(c) amorphous niobium oxide nanoparticles and/or web; and/or (d) additional nanostructures selected from undoped tungsten oxide, molybdenum oxide, titanium oxide, and/or vanadium oxide.

The counter electrode 108 may include one or more of the following components:

(a) passive electrode material selected from cerium(IV) oxide ($CeO_2$), titanium dioxide ($TiO_2$), cerium(III) vanadate ($CeVO_2$), indium(III) oxide ($In_2O_3$), tin-doped indium oxide, tin(II) oxide ($SnO_2$), manganese-doped tin oxide, antimony-doped tin oxide, zinc oxide (ZnO), aluminum-doped zinc oxide (AZO), iron(III) oxide ($Fe_2O_3$), and vanadium(V) oxide ($V_2O_5$);

(b) an active electrode material selected from chromium (III) oxide ($Cr_2O_3$), manganese dioxide ($MnO_2$), iron(II) oxide (FeO), cobalt oxide (CoO), nickel(II) oxide (NiO), rhodium(IV) oxide ($RhO_2$), and iridium(IV) oxide ($IrO_2$);

(c) amorphous nickel oxide nanoparticles and/or web; and/or (d) conductivity enhancer nanoparticles selected from indium oxide, ITO, and zinc oxide.

While the various embodiments are described with respect to EC windows, the embodiment methods, systems, and devices may also be used in materials for other types of smart windows. Such smart windows may include, but are not limited to, polymer-dispersed liquid crystals (PLDD), liquid crystal displays (LCDs), thermochromics, etc.

Figure 2A:
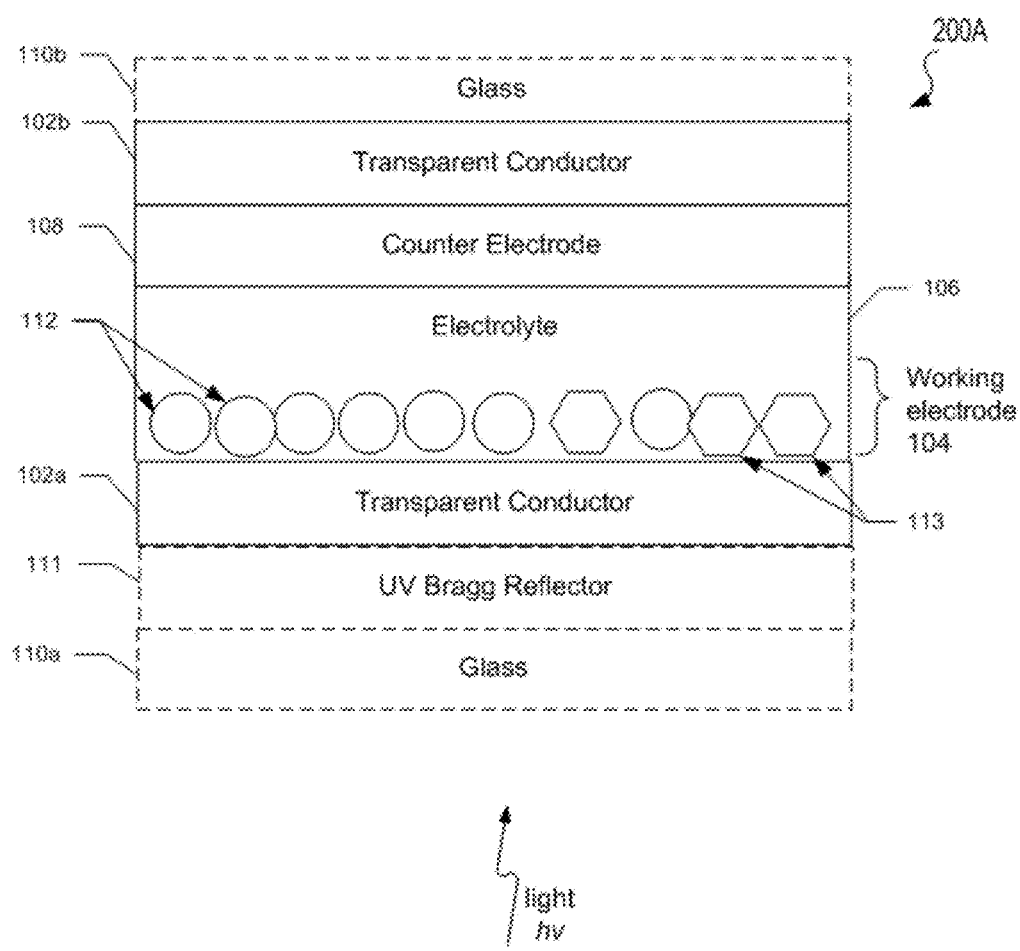
FIGS. 2A-2C are schematic diagrams of EC devices including distributed Bragg reflectors, according to various embodiments of the present disclosure.

FIG. 2A illustrates a schematic view of an EC device 200A, according to various embodiments of the present disclosure. The EC device 200 is similar to the EC device 100 of FIG. 1A, so only the differences therebetween will be discussed in detail.

Referring to FIG. 2A, in contrast to the EC device 100, the EC device 200A includes a distributed Bragg reflector 111 ("Bragg reflector" hereinafter) disposed between a light transmissive first substrate 110a (e.g., a glass substrate), and the transparent conductor layer 102a. The Bragg reflector 111 is configured to selectively reflect UV radiation (e.g., radiation having a wavelength of less than about 400 nm, such as a wavelength ranging from about 100 to about 400 nm) from light transmitted through the first substrate 110a, away from the working electrode 104. The Bragg reflector 111 is also configured to transmit visible light there through. In this embodiment, the first substrate 110a may be configured in a window to receive outdoor light such as sunlight. For example, the first substrate 110a may be an outer window pane (e.g., a glass window pane facing outside of a vehicle or a structure, such as a building, in which the EC device 200A is installed), and a light transmissive second substrate 110b may be an inner middle window pane (e.g., a glass window pane facing inside of the vehicle or structure in which the EC device 200A is installed). Accordingly, the EC device 200A may be configured as a dual pane or multi-pane EC window.

Figure 2B:
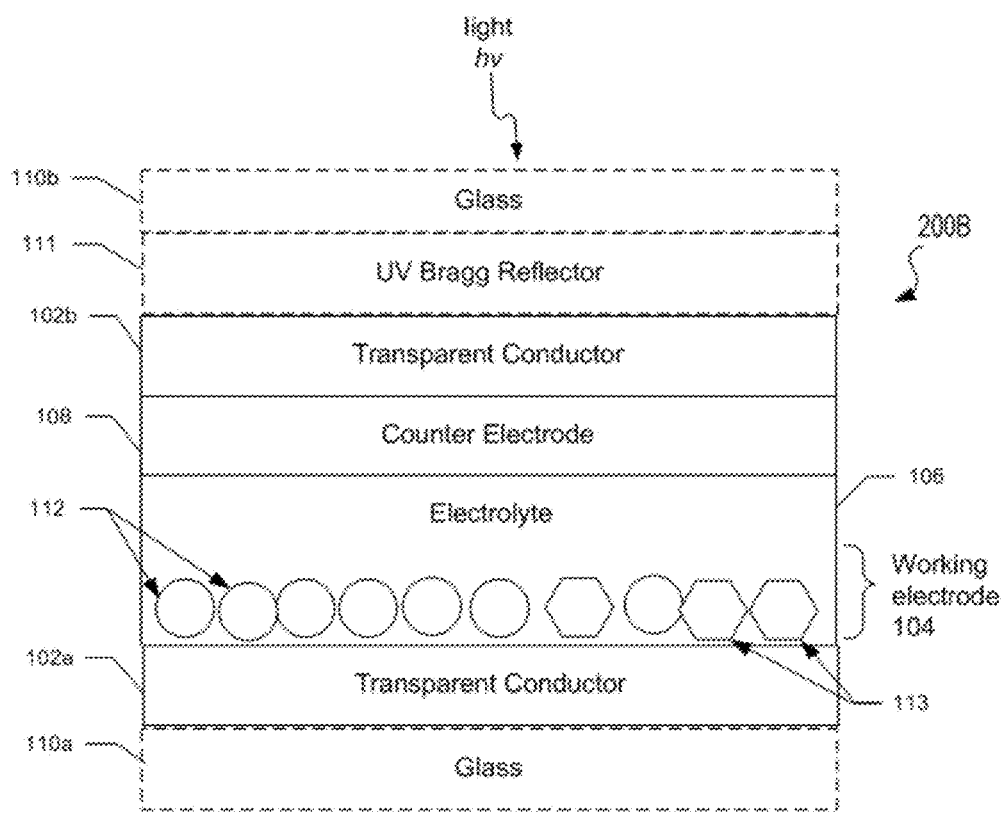

FIG. 2B illustrates a schematic view of an EC device 200B, according to various embodiments of the present disclosure. The EC device 200B is similar to the EC device 200A of FIG. 1A, so only the differences therebetween will be discussed in detail.

Referring to FIG. 2B, in contrast to the EC device 200A, the EC device 200B is configured to receive outdoor light (e.g., sunlight) through a light transmissive second substrate 110b (e.g., a glass substrate). Accordingly, the EC device 200B includes a distributed Bragg reflector 111 that is disposed between the second substrate 110b and the transparent conductor 102b (e.g., the second substrate 110b may be an outer pane of a multi-pane EC window, with the first substrate 110a being a middle pane thereof).

Utilizing a single Bragg reflector 111 provides benefits in terms of reduced costs. In general, the Bragg reflector 111 is preferably located between one of the substrates (e.g., an outer window pane) and the rest of the EC device (e.g., the nearest electrode to the outer window pane). As compared to the EC device 200A, the configuration of the EC device 200B provides a longer path length for UV radiation to travel to the working electrode 104.

Figure 2C:
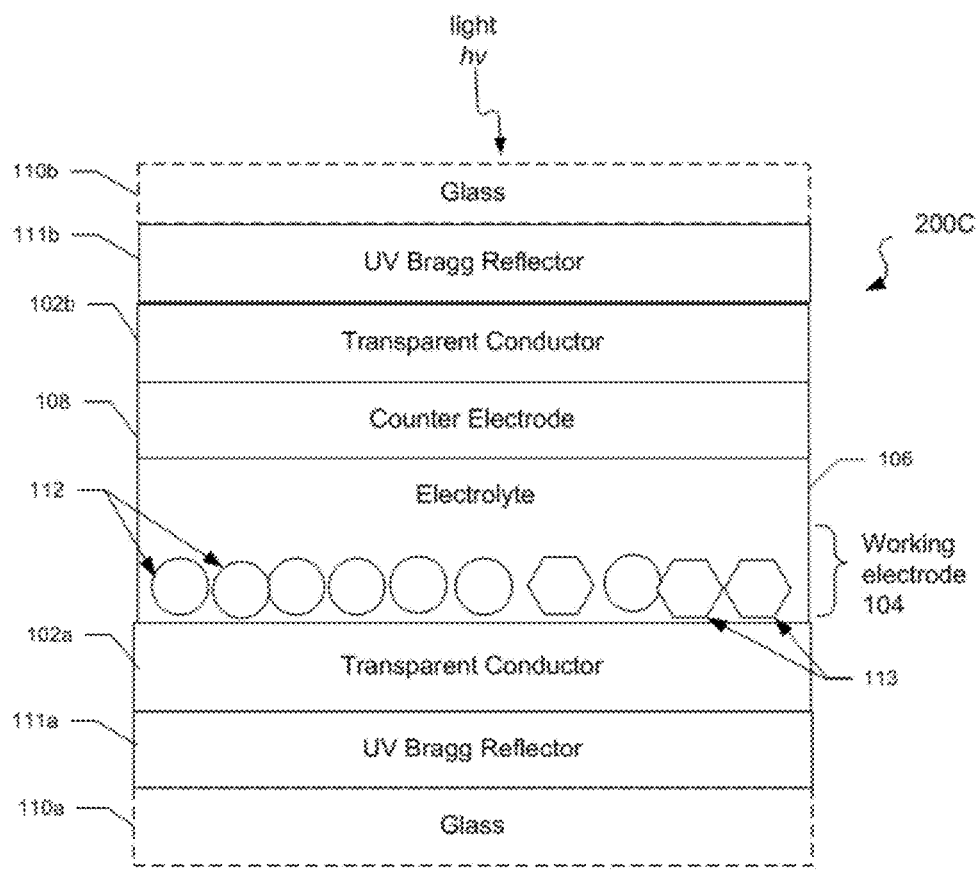

FIG. 2C illustrates a schematic view of an EC device 200C, according to various embodiments of the present disclosure. The EC device 200C is similar to the EC device 200A of FIG. 1A, so only the differences therebetween will be discussed in detail.

Referring to FIG. 2C, the EC device 200C may include a first Bragg reflector 111a disposed on the first substrate 110a and a second Bragg reflector 111b disposed on the second substrate 110b. The use of the two Bragg reflectors 111a, 111b operates to improve blocking of reflected UV radiation.

Figure 2D:
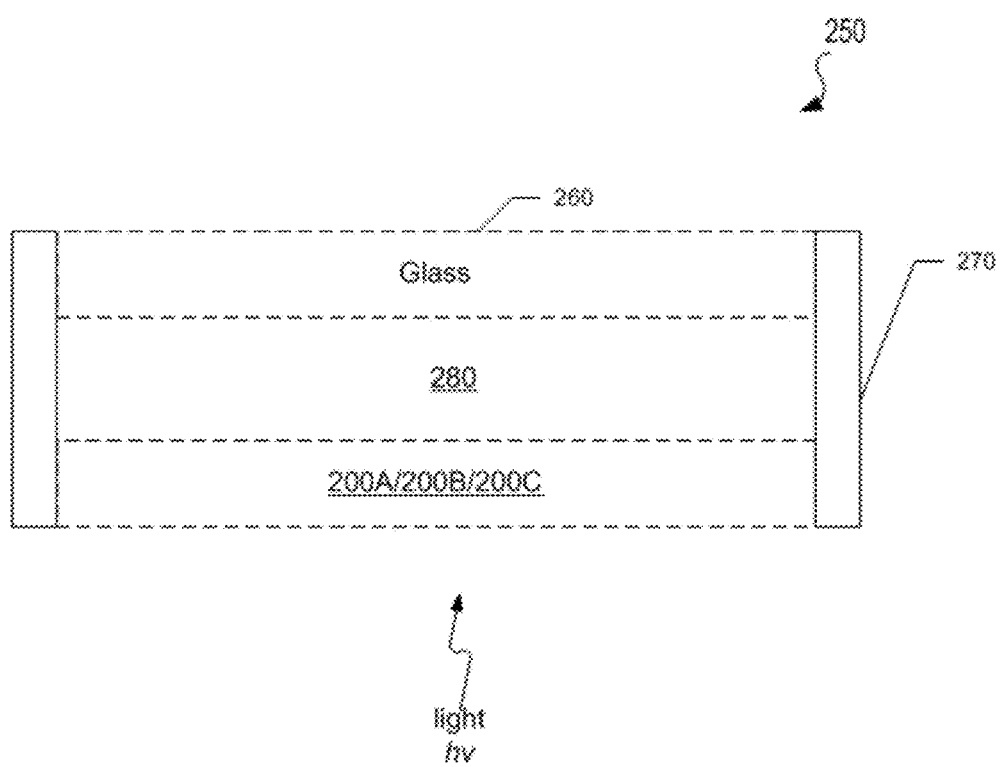
FIG. 2D is a top schematic view of an EC window 250 including one of the EC devices of FIGS. 2A-2C, according to various embodiments of the present disclosure.

FIG. 2D is a top schematic view of an EC window 250, according to various embodiments of the present disclosure. Referring to FIG. 2D, the window 250 includes one of the EC devices 200A, 200B, 200C an inner pane 260, and a frame 270. The frame 270 maintains a gap 280 between the EC device 200A/200B and the inner pane 260. The gap 280 may be maintained at below atmospheric pressure, may be filled with air, or may be filled with argon. The inner pane 260 may be disposed inside of a structure in which the window 250 is mounted, and the EC device 200A/200B may be disposed on the outside of the structure. The inner pane 260 may be formed of glass or plastic and may be coated with a low-emissivity coating.

Figure 3:
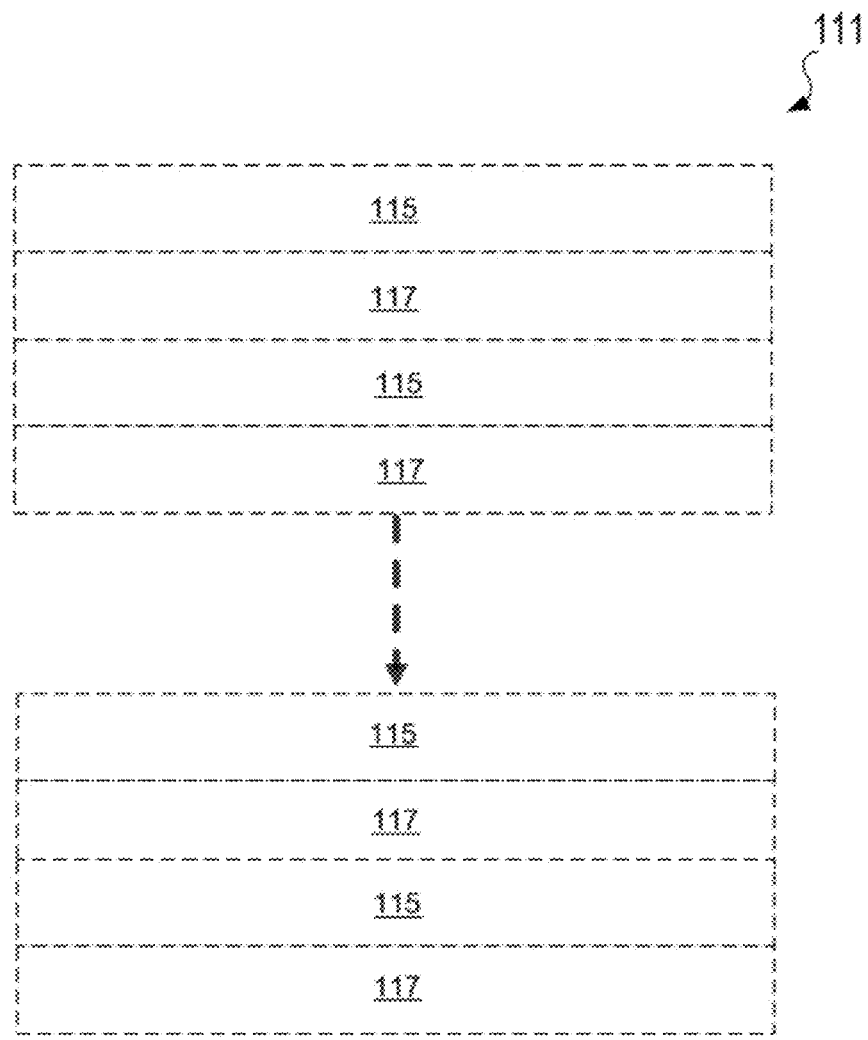
FIG. 3 is a sectional view of a distributed Bragg reflector, according to various embodiments of the present disclosure.

FIG. 3 is a side view of the Bragg reflector 111 of FIG. 2A, 2B or 2C. Referring to FIG. 3, the Bragg reflector 111 includes an alternating stack of first layers 115 and second layers 117. The Bragg reflector 111 may include any suitable number of the first and second layers 115, 117. For example, the Bragg reflector 111 may include from, for example, 10 to 21 total layers, depending on the materials included in the layers 115, 117.

The first and second layers 115, 117 may be formed of materials that have different refractive indexes. For example, the first and second layers 115, 117 may be formed of different ones of $TiO_2$, $SiO_2$, $ZnO_x$, $ZnAlO_x$, and $ZnSnO_x$ layers. According to some embodiments, the first and second layers 115, 117 may be formed of different ones of $TiO_2$ and $SiO_2$ layers, respectively. The optical thickness of the first and second layers 115, 117 may be approximately four times the wavelength of UV radiation, in order to produce constructive interference and reflection of the UV radiation.

When operating the EC device in a bright mode, the EC device transmits at least 50% of received visible light, and when operating the EC device in a dark mode, the EC device transmits 5% or less of received visible light. In both bright and dark modes, the Bragg reflector 111 selectively reflects a majority (e.g., at least 50%) of UV radiation incident thereto and transmits a majority (e.g., at least 50%) of received visible light incident thereto. The Bragg reflector 111 may transmit from about 75 to about 99% of visible light incident thereto, such as about 85 to about 95% of visible light incident thereto. The Bragg reflector may reflect from about 75 to about 99% of UV radiation incident thereto, such as from about 85 to about 95% of received UV radiation incident thereto.

Figure 4A:
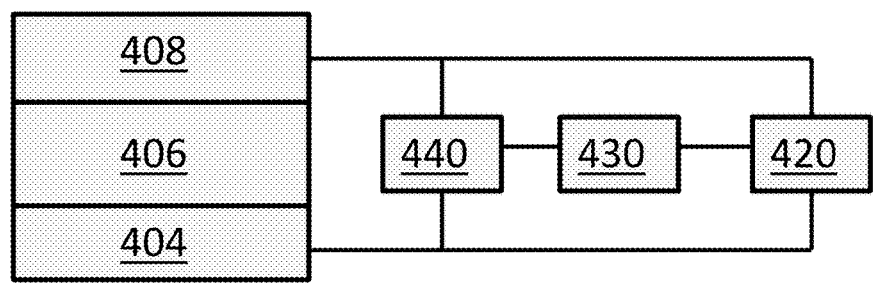
FIG. 4A is a schematic representation of an EC system 400 according to various embodiments of the present disclosure.

FIG. 4A is a schematic view of an EC system 400 according to various embodiments of the present disclosure. Referring to FIG. 4A, the EC system 400 includes an EC device 401, which may be similar to any of the EC devices discussed above. However, for simplicity, only a counter electrode 408, a working electrode 404, and a solid state electrolyte 406 of the EC device 401 are shown. The EC system 400 may also include an optional voltage detector 440, a control unit 430, and a power supply 420.

The voltage detector 440 may be electrically connected to the EC device 401 and may be configured to detect an open circuit voltage (OCV) between the counter and working electrodes 408, 404. As discussed above, the OCV may be reduced (e.g., made negative) by UV (or higher) radiation applied to the EC device 401, and in particular, applied to the working electrode 404 and/or electrolyte 406. In particular, such radiation (e.g., UV component of sunlight) may result in photochromic darkening of the EC device 401. Specifically, such radiation may generate electron-hole pairs (e.g., excitons) in the working electrode 404 and/or the electrolyte 406. The electron-hole pairs may result in hole-based oxidation of proton sources (e.g., organic electrolyte molecules) that are in contact with a metal oxide of the working electrode 404, such as doped or undoped tungsten oxide bronze described above. The concurrent transfer of an electron from the oxidized adjacent proton source coupled with the insertion of a proton from the adjacent molecule into the working electrode results in a reduction of the oxidation state of the tungsten and the corresponding absorption feature (electrochromic darkening).

The control unit 430 may include one or more control circuits, a computing device such as a central processing unit, or the like. The control unit 430 and may be electrically connected to the voltage detector 440 and the power supply 420. The power supply 420 may be an energy storage device, such as a battery or supercapacitor, or a power grid connection. In some embodiments, the voltage detector 440 and/or the power supply 420 may be incorporated into the control unit 430. In other embodiments, as discussed below, the voltage detector 440 may be omitted.

According to various embodiments, the control unit 430 may be configured to control the application of a sweep voltage to the EC device 401. For example, the control unit 430 may be configured to control the power supply 420 to apply the sweep voltage between the electrodes 404, 408. In some embodiments, the control unit 430 may be configured to apply the sweep voltage according to the OCV detected by the voltage detector 440. In particular, if the OCV drops below a negative threshold voltage, the control unit 430 may be configured to apply the sweep voltage, which may form a bias voltage between the working and counter electrodes 404, 408. The threshold voltage may be a bias voltage ranging from about −0.1 volts to about −2.0 volts, such as from about −0.5 volts to about −1.75 volts, or from about −0.75 volts to about −1.5 volts.

The sweep voltage may be a positive potential relative to the OVC. In some embodiments, the sweep voltage may have a magnitude that exceeds the magnitude of the OCV. In various embodiments, the sweep voltage may be a bias voltage ranging from about 0.5 to about 5 volts. For example, the sweep voltage may be a bias voltage ranging from about 1 to about 4 volts, such as a bias voltage ranging from about 1.5 volts to about 3 volts, or from about 2 volts to about 2.5 volts.

The sweep voltage may be applied as a pulse or may be a constant voltage applied for a particular period of time. The sweep voltage may be configured to generate a minimum saturation current between the counter and working electrodes 408, 404. For example, the minimum saturation current may range from about 10 to 30 $\mu A/cm^2$, such as from about 15 to 25 $\mu A/cm^2$, or about 20 $\mu A/cm^2$. In other embodiments, the sweep voltage may be applied continuously.

According to various embodiments, the system 400 may optionally be configured to use an optical feedback loop to track the photochromic darkening of the EC device 401. In particular, the system 400 may include an optical detector (e.g., photodetector) which functions as a transmittance detector to detect an amount of light transmittance through the EC device 401, and in particular, an amount of light transmittance through the working electrode 408. If the optical detector detects a decrease in transmittance above a predetermined threshold value without a corresponding signal form the control unit 430 to place the device in the dark state, then this indicates that a sufficient amount of undesirable photochromic darkening has occurred. In this case, the control unit 430 applies the sweep voltage of the EC device 401. For example, the detector 440 may comprise an optical detector instead of or in addition to a voltage detector and may include a light source to radiate light through the EC device 401, and a photodetector configured to detect an amount of the light that is transmitted through the EC device 401. In other embodiments, the light source may be omitted and ambient light may be used as the light source. The light source and/or the photodetector may be disposed inside (i.e., embedded in) the EC device 401, or may be disposed on or in a frame supporting the EC device 401, such as a window frame.

According to various embodiments, the present disclosure provides a method of using the system 400 to remove or reduce a photogenerated charge from the working electrode 404, by periodically applying the sweep voltage. For example, the sweep voltage may be applied at a particular frequency, such as once every few hours (e.g., every 6 to 23 hours), once a day (e.g., every 24 hours), once every few days (e.g., ever 2-6 days), once a week, etc.

Since the sweep voltage may result in an increase in the transparency of the EC device 401, the control unit 430 may be configured to apply the sweep voltage at a particular time of day or day of the week. For example, the control unit 430 may be configured to apply the sweep voltage at night. Preferably, the sweep voltage may be applied late at night (e.g., between midnight and 5 AM, such as between 1 AM and 4 AM) when the building is either unoccupied in case of an office building, or the occupants are asleep in case of a residential building, since the sweep voltage would cause the window to brighten. In other embodiments, the sweep voltage may be applied during a time when a room including the EC device 401 is generally unoccupied, such as during weekend, during the week, or during holidays.

When the sweep voltage is applied periodically (e.g., at a set frequency) or according to a set schedule, the voltage detector 440 may be omitted from EC system 400. Further, in some embodiments the control unit 430 may include date and/or clock circuitry or a data receiver (i.e., wired or wireless data receiver) to receive data and/or time information from another source (e.g., from the internet). In other embodiments, the control unit 430 may include a memory storing dates and/or times for applying the sweep voltage.

In various embodiments, the control unit 430 may be configured to receive external signals, such as wired or wireless data signals or the like. Such signals may be configured to update and/or modify the information stored in the memory of the control unit 430. In other embodiments, the signals may be control signals configured to control the application of the sweep voltage and/or the transparency of the EC device 401.

According to various embodiments, the EC device 401 may also include one or more of the protective layers 118, and/or one or more of the Bragg reflectors 111 disclosed above. In particular, when the sweep voltage is applied to the EC device 401 including one or more of such layers, a synergistic protective effect may be produced, which can provide an unexpected increase in the lifespan of optical dynamic range of the EC device 401.

Figure 4B:
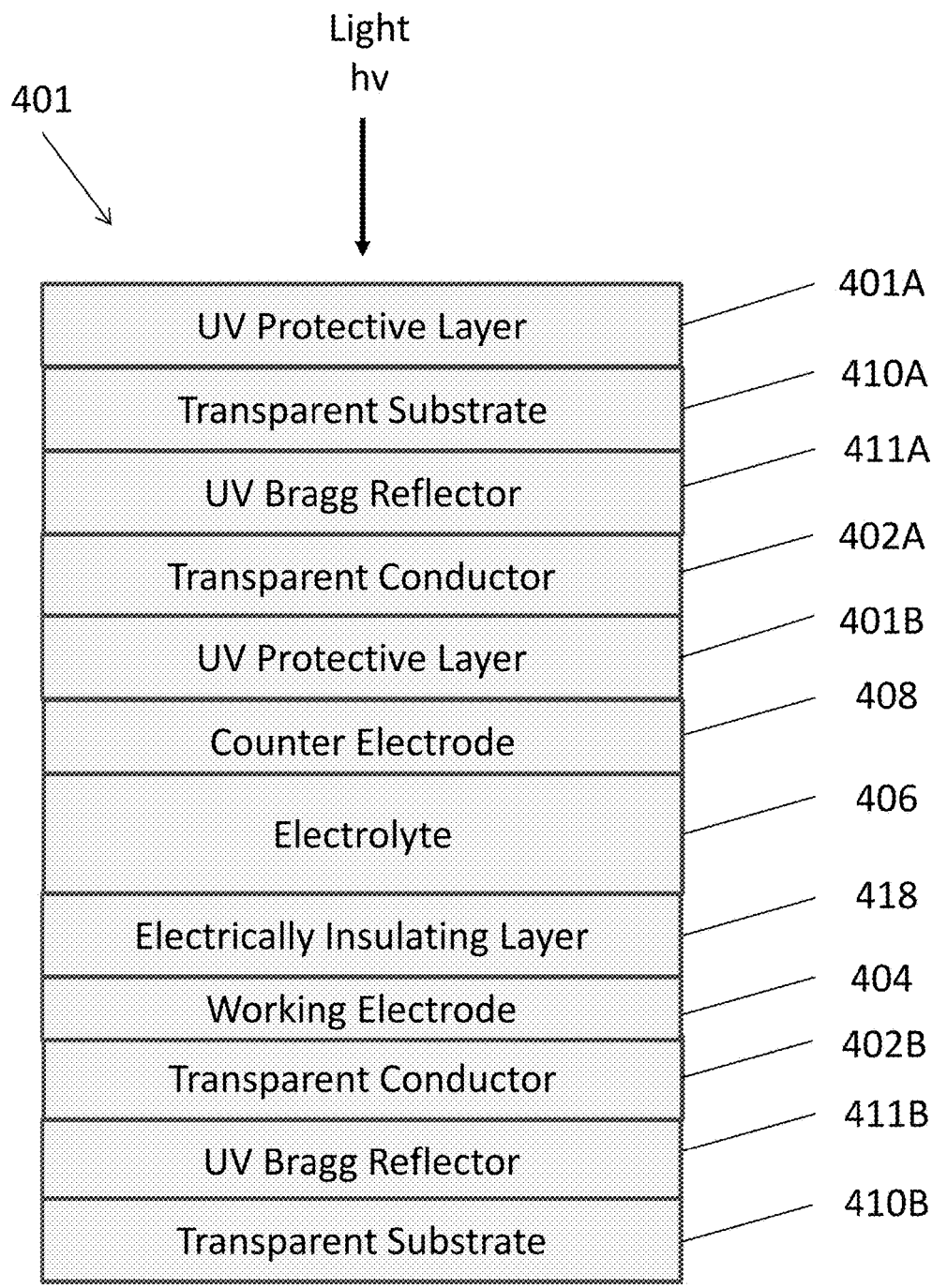
FIG. 4B is a schematic representation of an EC device that may be included in the EC system of FIG. 4A, according to various embodiments of the present disclosure.

FIG. 4B is a schematic representation of one exemplary embodiment of the EC device 401 included in the EC system of FIG. 4A, according to various embodiments of the present disclosure. Referring to FIG. 4B, the EC device 401 may optionally include any one or more of the following layers: a first UV protective layer 401A disposed on an outer surface of a transparent first substrate 410A, a first UV Bragg reflector 411A disposed between an inner surface of the transparent first substrate 410A and a first transparent conductor 402A, a second UV protective layer 401B disposed between the first transparent conductor 402A and a counter electrode 408, an electrically insulating layer 418 disposed between the electrolyte 406 and the working electrode 404, and/or a second Bragg reflector 411B disposed between the second transparent conductor 402B and a transparent second substrate 410B.

In other exemplary embodiments, a method of controlling photochromic darkening of an EC device includes determining an amount of time the EC device has been in the same mode (e.g., time since a voltage from the power supply 420 was applied to the EC device to change the color/transmissivity thereof from bright to dark or from dark to bright), and applying a sweep voltage to the EC device if the determined amount of time exceeds a threshold time period. In some embodiments, the threshold time period may be about 6 to 23 hours, or about one day (i.e., about 24 hours), or may be a time period ranging from about one day to about 5 days, or from about two days to about four days. In some embodiments, determining the amount of time may include determining an amount of time since a positive voltage was applied to the EC device.

For example, an EC device may be maintained in a dark, bright, or intermediate state/mode for an extended period of time, such as when a structure including the EC device is unoccupied for a given amount of time. In this case, a sweep voltage may be applied after the EC device has been inactive for longer than the threshold time period.

Thus, according to various embodiments described above, a method of controlling photochromic darkening of an EC device that includes applying a sweep voltage to the EC device periodically and/or on specific dates. For example, the sweep voltage may be applied once per day, such as during the night, once every two, three, four, or five days, or once a week. In other embodiments, the sweep voltage may be applied on specific dates during which the EC device is likely to be inactive, such as during weekends and/or holidays. Periodically applying a sweep voltage comprises applying the sweep voltage at a predetermined time that is independent of applying a bright mode voltage to the EC device by a user or a control system. In other words, the sweep voltage is independent of a user turning the EC device to its bright mode or the control system turning the EC device to its bright mode in response to decreased outside light.

In other exemplary embodiments, a method of controlling photochromic darkening of an EC device includes detecting the OCV of the EC device, and applying the sweep voltage to the EC device when the detected OCV drops below a threshold voltage. The threshold voltage may be a negative voltage (i.e., below 0V), such as a voltage ranging from about −0.1 volts to about −2.0 volts, such as from about −0.5 volts to about −1.75 volts, or from about −0.75 volts to about −1.5 volts.

The method may also include setting the magnitude of sweep voltage according to the detected OCV. For example, the method may include setting the absolute value of the sweep voltage to be approximately equal to, or greater than, the absolute value of the OVC. For example, if the detected OCV is −1V, then the applied sweep voltage is 1V or greater.

In various embodiments, the threshold time period may be set according to an amount of UV radiation encountered by the EC device, which may be determined using the detected OCV by the voltage detector 440 or detected UV radiation by an optional UV radiation detector. For example, when the EC device receives a relatively large amount of UV radiation, the threshold time period may be relatively short, and when the EC device receives a relatively small amount of UV radiation, the threshold time period may be relatively long.

Experimental Embodiments

Figure 5A:
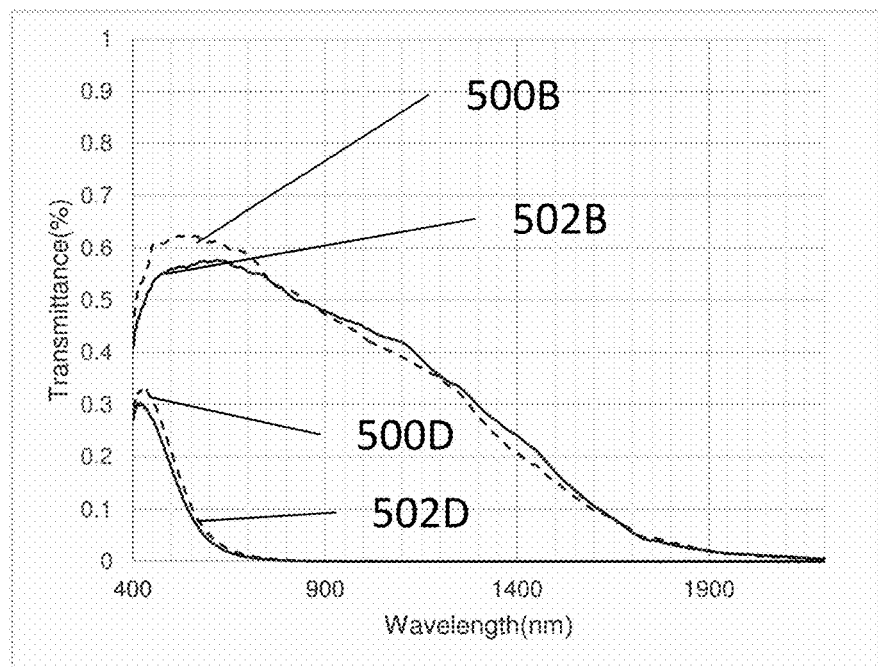
FIGS. 5A-5C are graphs illustrating transmittance spectra (in percent transmittance versus wavelength in nm) of exemplary and comparative EC devices according to various embodiments, before and after UV treatment.
Figure 5B:
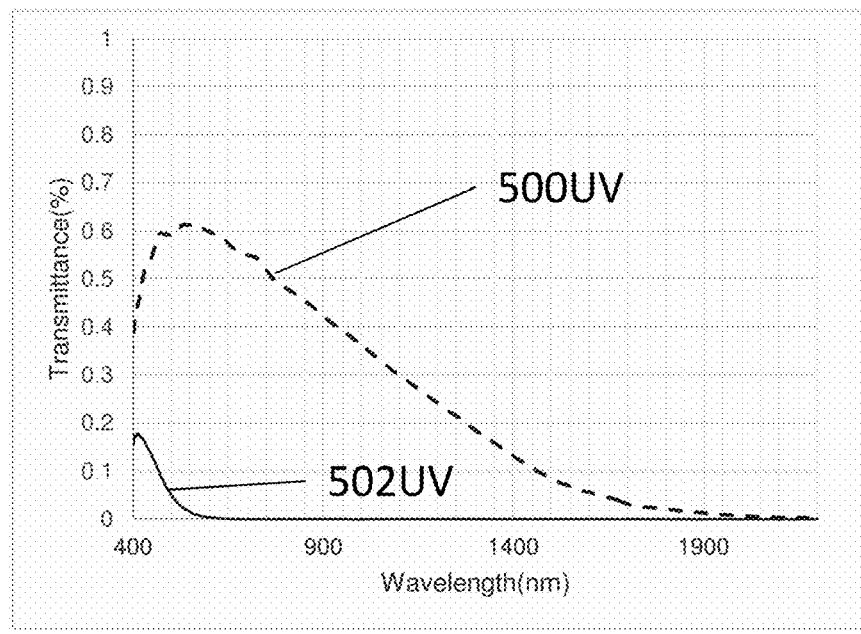
Figure 5C:
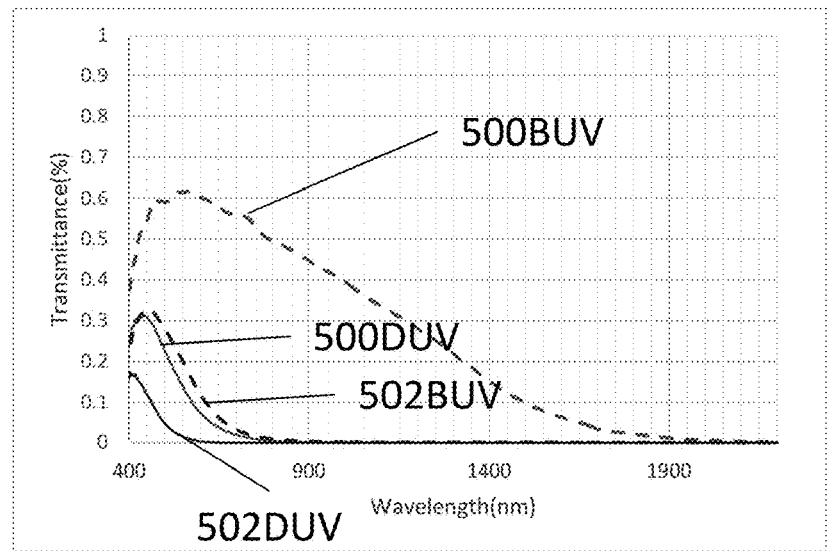
Figure 5D:
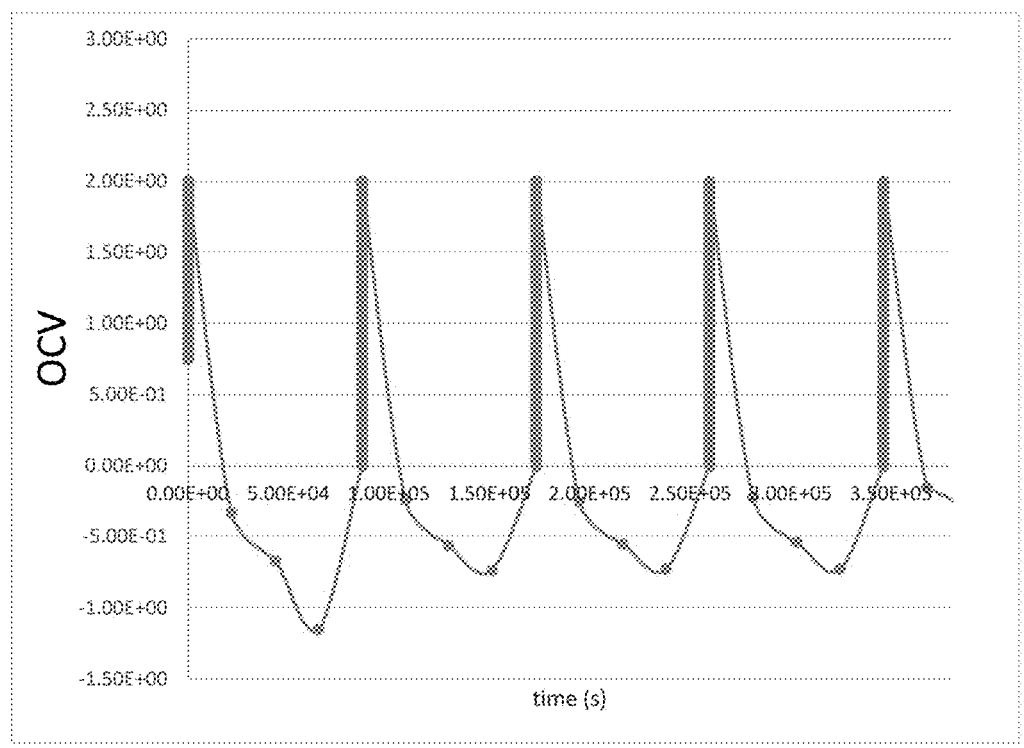
FIG. 5D is a graph illustrating an open circuit voltage of the exemplary EC device, during the application of UV radiation and a sweep voltage.

FIG. 5A is a graph illustrating bright and dark state transmittance spectra 500B, 500D of an exemplary EC device, and bright and dark state transmittance spectra 502B, 502D of a comparative EC device, before UV exposure, according to various embodiments of the present disclosure. FIG. 5B is a graph illustrating the transmittance spectrum 500UV of the exemplary EC device and the transmittance spectrum 502UV of the comparative EC device, immediately after completion of the UV exposure. FIG. 5C is a graph illustrating the bright and dark state transmittance spectra 500BUV, 500DUV of the exemplary EC device, and the bright and dark state transmittance spectra 502BUV, 500DUV of the comparative EC device, after completion of the UV exposure and bright and dark mode biasing of the device at 2V and −1.5V respectively. FIG. 5D is a graph illustrating OCV of the exemplary EC device as a function of time, during UV exposure and sweep voltage application.

Referring to FIG. 5A, the exemplary and comparative EC devices exhibited similar bright and dark state transmittance prior to UV exposure.

Referring to FIG. 5B, the exemplary and comparative EC devices were exposed to UV continuously for 871 hours, in an accelerated-life testing chamber. The chamber was calibrated to expose each EC device to broadband Xenon-source white light with a "noon summer sunlight" daylight filter adjusted to provide a 0.55 W/m² intensity at 340 nm (similar to ASTM G155 cycle 8). A 2V sweep voltage was applied once per day to the exemplary EC device, until a minimum saturation current of 20 µA/cm² was reached. A sweep voltage was not applied to the comparative embodiment during the entire exposure process.

As can be seen in FIGS. 5A and 5B, the transmittance of the exemplary EC device was substantially the same before and after UV exposure. In contrast, the transmittance of the comparative EC device was significantly reduced, due to EC darkening induced by the UV exposure.

Referring to FIG. 5C, the exemplary and comparative EC devices were subjected to bright and dark state modulation (i.e., application and 2V and −1.5V biases between the electrodes to place the device in the bright and dark state, respectively). The resulting transmittance spectra of both devices indicates that only the exemplary EC device, which was periodically biased with the 2V sweep voltage during UV exposure, was able to recover its initial dark and bright performance. In comparison, the comparative EC device, to which a sweep voltage was not applied during UV exposure, was not able to "bleach" or de-color its UV generated photochromism. This comparison proves that dark-to-bright modulation can be maintained through a periodic application of a sweep voltage during UV exposure.

Referring to FIG. 5D, the 2V sweep voltage was applied every 24 hours during UV exposure, resulting in a periodic increase of the OCV to 2V. Between applications of the sweep voltage, the OCV became negative, indicating coloration induced by the UV generated photochromism.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

The invention claimed is:

1. An electrochromic (EC) system, comprising:
   an EC device comprising:
      a working electrode;
      a counter electrode;
      a solid state electrolyte layer disposed between the counter and working electrodes; and
   a control unit configured to selectively apply a sweep voltage between the working and counter electrodes, such that the sweep voltage is applied when an open circuit voltage (OCV) between the working and counter electrodes is less than a threshold voltage.

2. The EC system of claim 1, further comprising a voltage detector configured to detect the OCV, wherein the control unit is configured to apply the sweep voltage when the voltage detector detects that the OCV is below the threshold voltage.

3. The EC system of claim 1, wherein the threshold voltage is between 0V and −2V, and the sweep voltage is a positive voltage.

4. The EC system of claim 1, wherein the control unit is configured to:
   determine an amount of time since a voltage was applied to the EC device to change a transmissivity thereof; and
   apply the sweep voltage to the EC device, if determined amount of time exceeds a threshold time period.

5. The EC system of claim 1, wherein the control unit is configured to periodically apply the sweep voltage between the working and counter electrodes, such that a open circuit voltage between the working and counter electrodes is changed from a negative voltage below the threshold voltage to a positive voltage.

6. The EC system of claim 1, wherein the control unit is configured to:
   control the sweep voltage, such that the magnitude of the sweep voltage is greater than the magnitude of the OCV;
   control the sweep voltage, such that the sweep voltage applies a saturation current ranging from about 10 to 30 µA/cm² between the working and counter electrodes; and
   control the sweep voltage, such that the sweep voltage is applied at a frequency ranging from about 1 day to about 3 days.

7. The EC system of claim 1, wherein the control unit is configured to control the sweep voltage, such that the sweep voltage is applied only at night.

8. The EC system of claim 1, wherein the control unit is configured to control the sweep voltage, such that the sweep voltage is applied only on weekends, on holidays, or on weekends and holidays.

9. The EC system of claim 1, further comprising a power source electrically connected to the EC device and configured to generate the sweep voltage,
   wherein the control unit is configured to control the power source to control the application of the sweep voltage.

10. The EC system of claim 1, wherein the control unit is configured to control the sweep voltage, such that the sweep voltage ranges from about 0.5 volts to about 5 volts.

11. A method of controlling photochromic darkening of an EC device comprising a working electrode, a counter electrode, and a solid-state electrolyte disposed between the working and counter electrodes, the method comprising:
   detecting an open circuit voltage (OCV) between the working and counter electrodes of the EC device; and
   applying a sweep voltage between the working and counter electrodes, when the OCV is more negative than a threshold voltage.

12. The method of claim 11, wherein the threshold voltage ranges from 0 volts to about 2 volts.

13. The method of claim 11, wherein the sweep voltage ranges from about 0.5 volts to about 5 volts.

14. The method of claim 11, wherein a magnitude of the sweep voltage is greater than or equal to the magnitude of the OCV.

15. The method of claim 11, wherein the sweep voltage is configured to remove a UV photogenerated charge that causes photochromic darkening of the EC device.

16. The method of claim 11, wherein the sweep voltage is applied only at night.

17. A method of controlling photochromic darkening of an EC device comprising a working electrode, a counter electrode, and a solid-state electrolyte disposed between the working and counter electrodes, the method comprising:
determining an amount of time since a voltage was applied to the EC device to change the transmissivity thereof; and
applying a sweep voltage to the EC device, if determined amount of time exceeds a threshold time period.

18. The method of claim 17, wherein the threshold time period ranges from about 6 hours to about 4 days.

19. The method of claim 17, wherein a magnitude of the sweep voltage is greater than or equal to a magnitude of an open circuit voltage between the working and counter electrodes.

20. The method of claim 17, wherein the determining an amount of time comprises determining an amount of time since a positive voltage was applied to the EC device.

21. A method of controlling photochromic darkening of an EC device comprising a working electrode, a counter electrode, and a solid-state electrolyte disposed between the working and counter electrodes, the method comprising:
periodically applying a sweep voltage between the working and counter electrodes, such that an open circuit voltage between the working and counter electrodes is changed from a negative voltage to a positive voltage.

22. The method of claim 21, wherein the periodically applying a sweep voltage comprises applying the sweep voltage at night during every 24 hour period.

23. The method of claim 21, wherein the periodically applying a sweep voltage comprises applying the sweep voltage on weekends, holidays, or on weekends and holidays.

24. The method of claim 21, wherein the periodically applying a sweep voltage comprises applying the sweep voltage at a predetermined time that is independent of applying a bright mode voltage to the EC device by a user or a control system.

* * * * *